(12) United States Patent
Palaniswamy et al.

(10) Patent No.: US 11,649,004 B2
(45) Date of Patent: May 16, 2023

(54) SEAT DEVICES COMPRISING ARTIFICIAL MUSCLES

(71) Applicant: Toyota Motor Engineering & Manufacturing North America, Inc., Plano, TX (US)

(72) Inventors: Maduran Palaniswamy, Ann Arbor, MI (US); Michael P. Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 81 days.

(21) Appl. No.: 17/217,049

(22) Filed: Mar. 30, 2021

(65) Prior Publication Data

US 2022/0315147 A1  Oct. 6, 2022

(51) Int. Cl.
| | |
|---|---|
| *B62J 1/28* | (2006.01) |
| *B60N 2/90* | (2018.01) |
| *B62J 1/20* | (2006.01) |
| *B62J 1/26* | (2006.01) |

(52) U.S. Cl.
CPC ............... *B62J 1/28* (2013.01); *B60N 2/914* (2018.02); *B62J 1/20* (2013.01); *B62J 1/26* (2013.01)

(58) Field of Classification Search
CPC ....... B62J 1/28; B62J 1/20; B62J 1/26; B60N 2/914
See application file for complete search history.

(56) References Cited

U.S. PATENT DOCUMENTS

| | | | | |
|---|---|---|---|---|
| 5,170,364 | A | * | 12/1992 | Gross .................. A47C 31/123 297/284.6 |
| 5,318,344 | A | * | 6/1994 | Wang ....................... B62J 1/18 297/214 |
| 7,648,198 | B1 | * | 1/2010 | Matsler ...................... B62J 1/20 297/219.11 |
| 9,527,421 | B2 | | 12/2016 | Hulway |
| 10,279,719 | B2 | * | 5/2019 | Chiba ...................... B62J 45/414 |
| 10,960,793 | B2 | * | 3/2021 | Gandhi ............. B60N 2/42727 |
| 2014/0015293 | A1 | | 1/2014 | Pellenz et al. |

(Continued)

FOREIGN PATENT DOCUMENTS

| | | |
|---|---|---|
| CN | 201439361 U | 4/2010 |
| CN | 204264330 U | 4/2015 |

(Continued)

*Primary Examiner* — David R Dunn
*Assistant Examiner* — Tania Abraham
(74) *Attorney, Agent, or Firm* — Dinsmore & Shohl LLP

(57) ABSTRACT

A seat that includes an upper surface, a lower surface, one or more pressure sensors communicatively coupled to a controller, and a plurality of artificial muscles disposed between the upper surface and the lower surface. Each of the plurality of artificial muscles is communicatively coupled to the controller. Each of the plurality of artificial muscles includes a housing having an electrode region and an expandable fluid region, a dielectric fluid housed within the housing, and an electrode pair positioned in the electrode region of the housing. The electrode pair is actuatable between a non-actuated state and an actuated state such that actuation from the non-actuated state to the actuated state directs the dielectric fluid into the expandable fluid region, expanding the expandable fluid region.

19 Claims, 14 Drawing Sheets

(56) References Cited

U.S. PATENT DOCUMENTS

| | | | |
|---|---|---|---|
| 2017/0080833 A1* | 3/2017 | Dry | B60N 2/20 |
| 2017/0325599 A1* | 11/2017 | Bellam | A47C 7/62 |
| 2020/0032822 A1* | 1/2020 | Keplinger | F15B 15/08 |
| 2020/0139868 A1* | 5/2020 | Ceglarek | B60N 2/976 |
| 2020/0238854 A1* | 7/2020 | Gandhi | B60N 2/914 |
| 2022/0017005 A1* | 1/2022 | Rowe | B60N 2/879 |

FOREIGN PATENT DOCUMENTS

| | | | | |
|---|---|---|---|---|
| DE | 102017107714 B4 | 3/2019 | | |
| KR | 20150094440 A | 8/2015 | | |
| WO | 2015024837 A1 | 2/2015 | | |
| WO | 2020140501 A1 | 7/2020 | | |
| WO | WO-2020180982 A1 * | 9/2020 | | B32B 27/08 |

\* cited by examiner

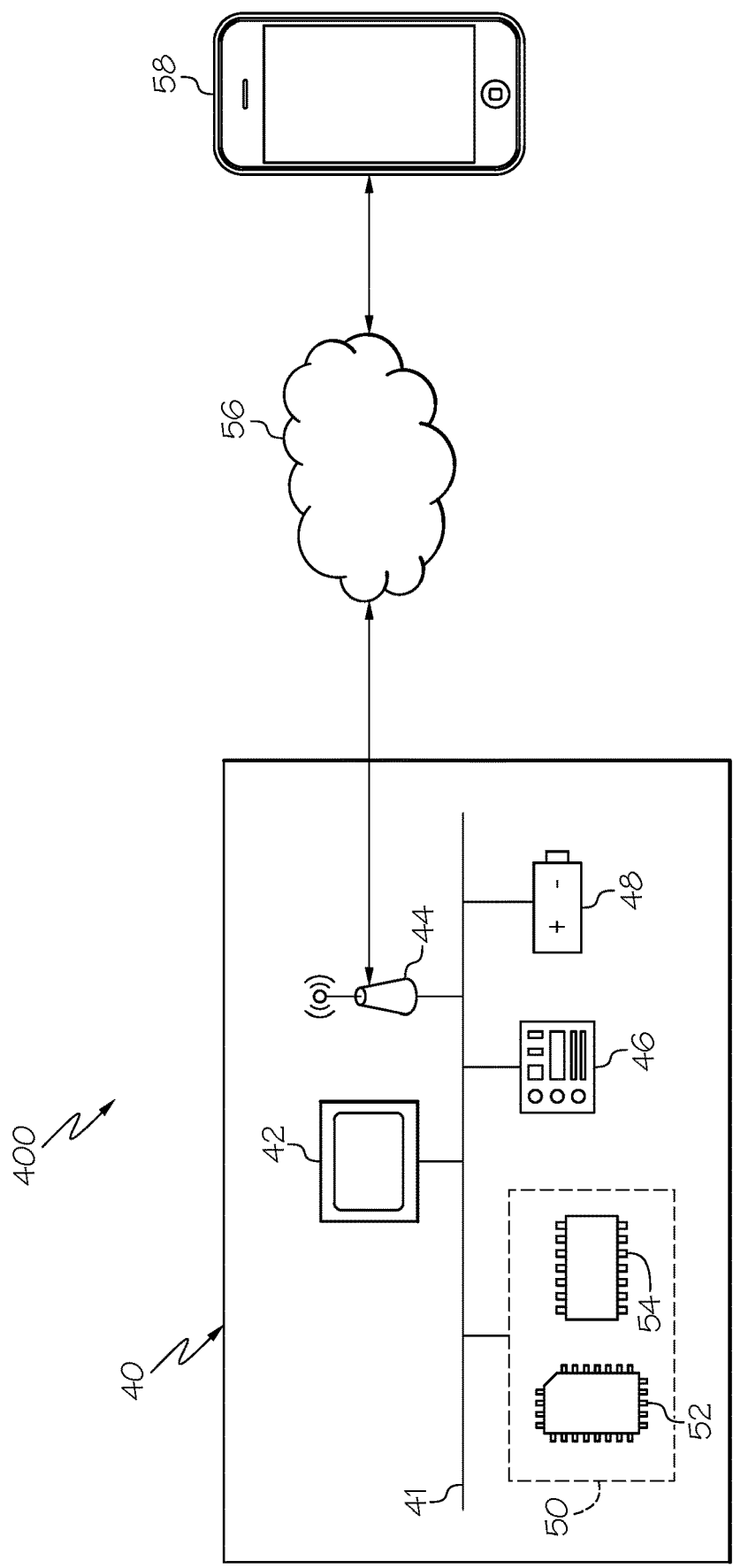

US 11,649,004 B2

SEAT DEVICES COMPRISING ARTIFICIAL MUSCLES

TECHNICAL FIELD

The present specification generally relates to seat devices and, in particular, to seat devices that include artificial muscles for providing a select amount of pressure to a body part of a user.

BACKGROUND

Seats are often used throughout daily life to at least partially support a weight of a user and prevent the need for a user to support his or her full body weight with his or her legs. Seats may come in a variety of implementations including lounging furniture, seats within vehicles, and seats for bicycles. Depending on the seat type and characteristics, such as the seat and/or seat cushion material and the shape of the seat, and user characteristics, such as body weight, positioning on the seat, and activity while on the seat, the user may experience discomfort through one or more pressure points on the user's body part contacting the upper surface of the seat. For instance, the seat may apply undesirable amounts of pressure to portions of the user's body part exhibiting swelling, tenderness, bruising, inflammation, or the like. By applying undesirably high pressures, the seat may result in discomfort, pain, and in some cases injury for the user.

Accordingly, a need exists for seats that may adjustably supply select pressures to a body part of a user without greatly increasing the size or weight of the seat with cumbersome hardware.

SUMMARY

In one embodiment, a seat includes an upper surface, a lower surface, one or more pressure sensors communicatively coupled to a controller, and a plurality of artificial muscles disposed between the upper surface and the lower surface. Each of the plurality of artificial muscles is communicatively coupled to the controller. Each of the plurality of artificial muscles includes a housing having an electrode region and an expandable fluid region, a dielectric fluid housed within the housing, and an electrode pair positioned in the electrode region of the housing. The electrode pair is actuatable between a non-actuated state and an actuated state such that actuation from the non-actuated state to the actuated state directs the dielectric fluid into the expandable fluid region, expanding the expandable fluid region.

In another embodiment, a seat assembly includes a bike seat, the bike seat having a bike seat upper surface, and a bike seat liner removably coupled to the bike seat. The bike seat liner includes a liner upper surface, a liner lower surface, one or more pressure sensors communicatively coupled to a controller, and a plurality of artificial muscles disposed between the liner upper surface and the liner lower surface. Each of the plurality of artificial muscles is communicatively coupled to the controller. Each of the plurality of artificial muscles includes a housing having an electrode region and an expandable fluid region, a dielectric fluid housed within the housing, and an electrode pair positioned in the electrode region of the housing. The electrode pair is actuatable between a non-actuated state and an actuated state such that actuation from the non-actuated state to the actuated state directs the dielectric fluid into the expandable fluid region, expanding the expandable fluid region.

In yet another embodiment, a method for actuating a seat, the method includes providing a voltage using a power supply electrically coupled to an electrode pair of an artificial muscle, the artificial muscle disposed in a cavity between an upper surface and a lower surface of the seat. The artificial muscle includes a housing having an electrode region and an expandable fluid region. The electrode pair is positioned in the electrode region of the housing and the electrode pair includes a first electrode and a second electrode. A dielectric fluid is housed within the housing. The method also includes applying the voltage to the electrode pair of the artificial muscle, thereby actuating the electrode pair from a non-actuated state to an actuated state such that the dielectric fluid is directed into the expandable fluid region of the housing and expands the expandable fluid region, thereby applying pressure to the upper surface of the seat.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 16 schematically depicts an actuation system for operating the seat of FIGS. 1A-4 and seat liner of FIG. 5, according to one or more embodiments shown and described herein.

DETAILED DESCRIPTION

Figure 1A:
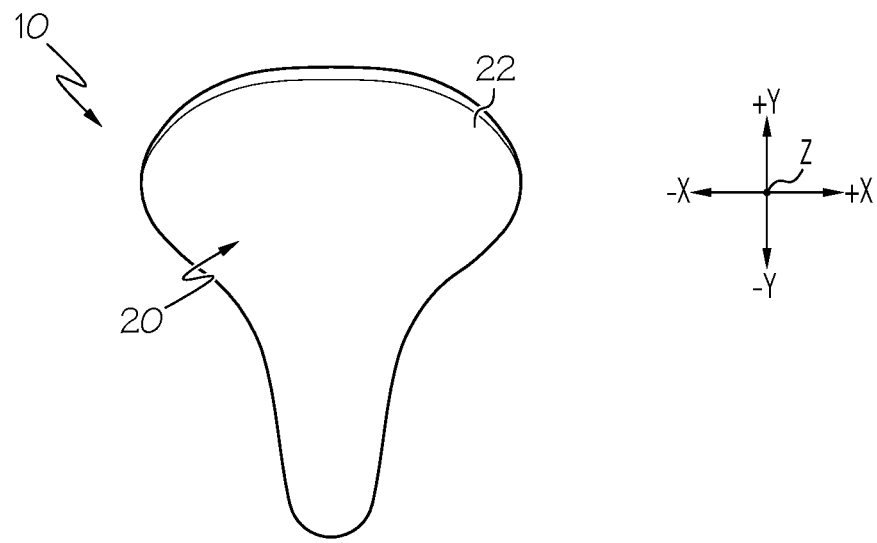
FIG. 1A schematically depicts a seat, according to one or more embodiments shown and described herein.

Embodiments described herein are directed to seat devices that include one or more artificial muscles configured to apply a selective pressure to a body part of a user. The seat devices described herein include a lower surface, an upper surface that at least partially supports a body weight of a user through contact with a body part of the user, and a cavity between the lower and upper surfaces. The cavity includes the one or more artificial muscles, a portion of which contact the upper surface of the seat device, and one or more pressure sensors. The plurality of artificial muscles are actuatable to selectively raise and lower a region of the artificial muscles to provide a selective, on-demand, inflated expandable fluid region. In particular, the plurality of artificial muscles each include an electrode pair that may be drawn together by application of a voltage, thereby pushing dielectric fluid into the expandable fluid region, which applies localized pressure to the upper surface of the seat. Actuation of the plurality of artificial muscles of the seat device may dynamically alter the pressure applied by the upper surface of the seat to the body part of the user, achieving select pressures at select locations along the upper surface of the seat. Various embodiments of the seat devices and the operation of the seat devices are described in more detail herein. Whenever possible, the same reference numerals will be used throughout the drawings to refer to the same or like parts.

Figure 1B:
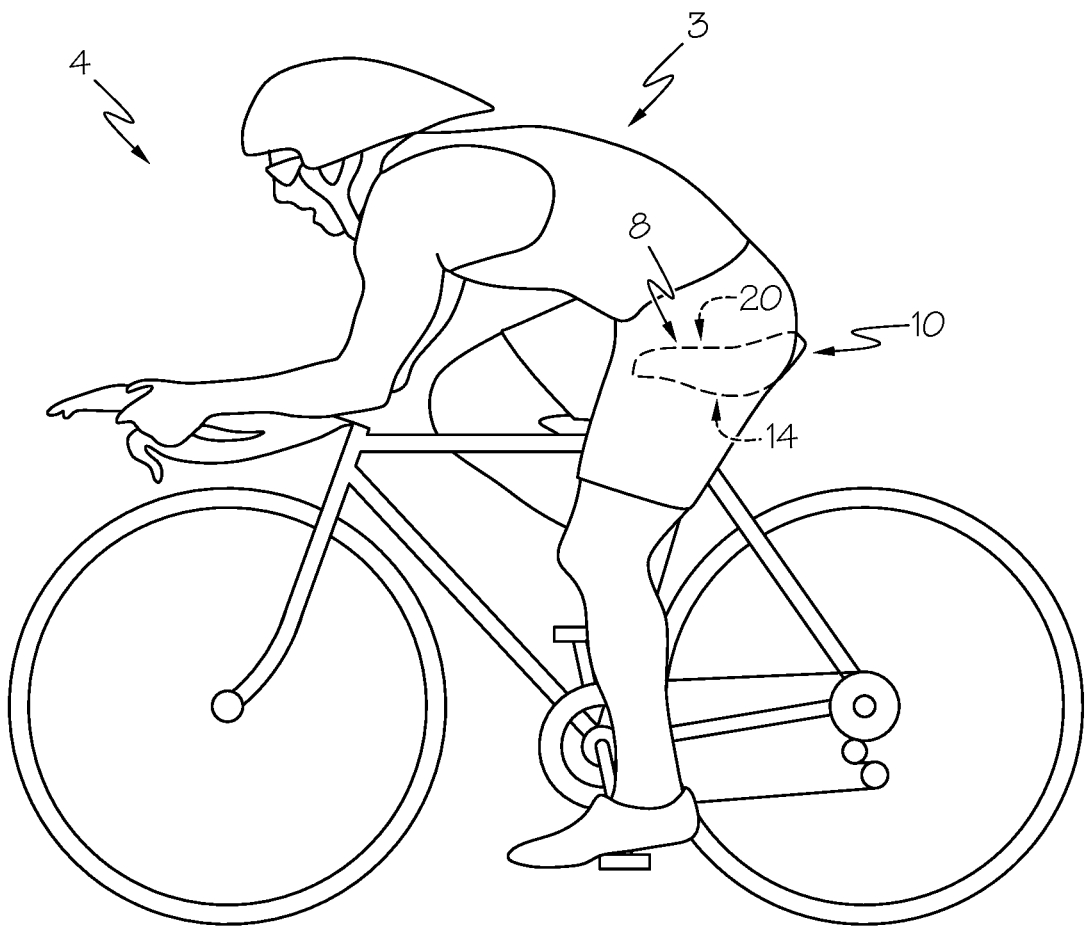
FIG. 1B schematically depicts the seat of FIG. 1A supporting a user, according to one or more embodiments shown and described here.

Referring now to FIG. 1A, a seat 10 is schematically depicted. While the seat 10 is depicted as a traditional bike seat, it should be appreciated that the seat 10 may take any desirable shape for any desirable application. For example, the perimeter and contours of an upper surface 20 of the seat 10, and more particularly, of the outer surface 22 of the upper surface 20, may vary depending on the specific application of the seat 10. That is, the shape of the seat 10 may vary depending on its implementation as a bike seat, a seat for lounging furniture, a vehicle seat, or the like. Referring now to FIG. 1B in addition to FIG. 1A, the seat 10 is depicted as a seat of a bike 4. While the term "bike" is used herein, it should be appreciated that the term may encompass bicycles, tricycles, mopeds, scooters, motorcycles, and any other instrument that generally utilizes a saddle-shaped seat for supporting a user. The seat 10 includes a lower surface 14 for providing support and stability to the seat 10. In other words, the lower surface 14 of the seat 10 provides a point for connecting the seat 10 to a frame of the bike 4. In other embodiments, the lower surface 14 of the seat 10 provides a point for connecting the seat 10 to one or more legs of a chair, for instance. At least a portion of the body weight of a user 3 is supported on the seat 10. More specifically, the seat 10 supports at least a portion of the body weight of the user 3 through contact between the outer surface 22 of the upper surface 20 of the seat 10 and a body part 8 of the user 3. When the seat 10 is implemented on the bike 4, as depicted in FIG. 1B, the body part 8 contacting the outer surface 22 of the upper surface 20 of the seat 10 may generally be the gluteus maximus, hamstring, and/or groin of the user 3.

Figure 2:
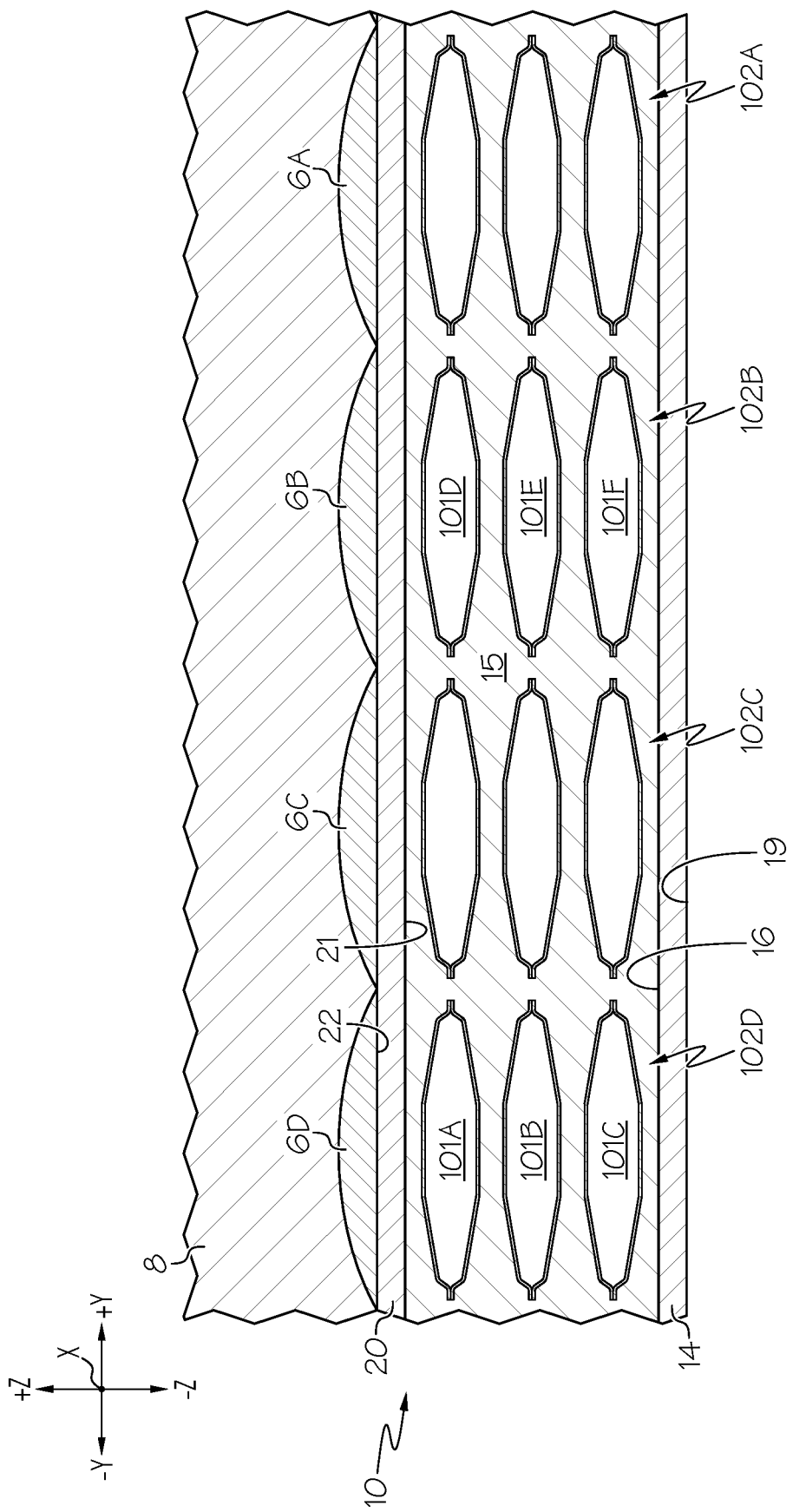
FIG. 2 schematically depicts a cross section of the seat of FIG. 1B supporting a user and in a non-actuated state, according to one or more embodiments shown and described herein.

Referring now to FIG. 2, the seat 10 includes the upper surface 20, the lower surface 14, and a cavity 15 disposed therebetween. The lower surface 14 includes an inner surface 16 and an outer surface 19. The upper surface 20 includes an inner surface 21 and the outer surface 22. The cavity 15 is positioned within the seat 10, disposed between the inner surface 16 of the lower surface 14 and the inner surface 21 of the upper surface 20 of the seat 10. It should be appreciated, however, that in some embodiments, one or both of the upper surface 20 and the lower surface 14 may include only an outer surface. That is, the upper surface 20 may include the outer surface 22 without the inner surface 21, and the lower surface 14 may include the outer surface 19 without the inner surface 16. Therefore, in embodiments, the cavity 15 may be disposed between any combination of the outer surface 22 or inner surface 21 of the upper surface 20 and the outer surface 19 or the inner surface 16 of the lower surface 14, depending on the particular configurations of the upper surface 20 and the lower surface 14.

Figure 6:
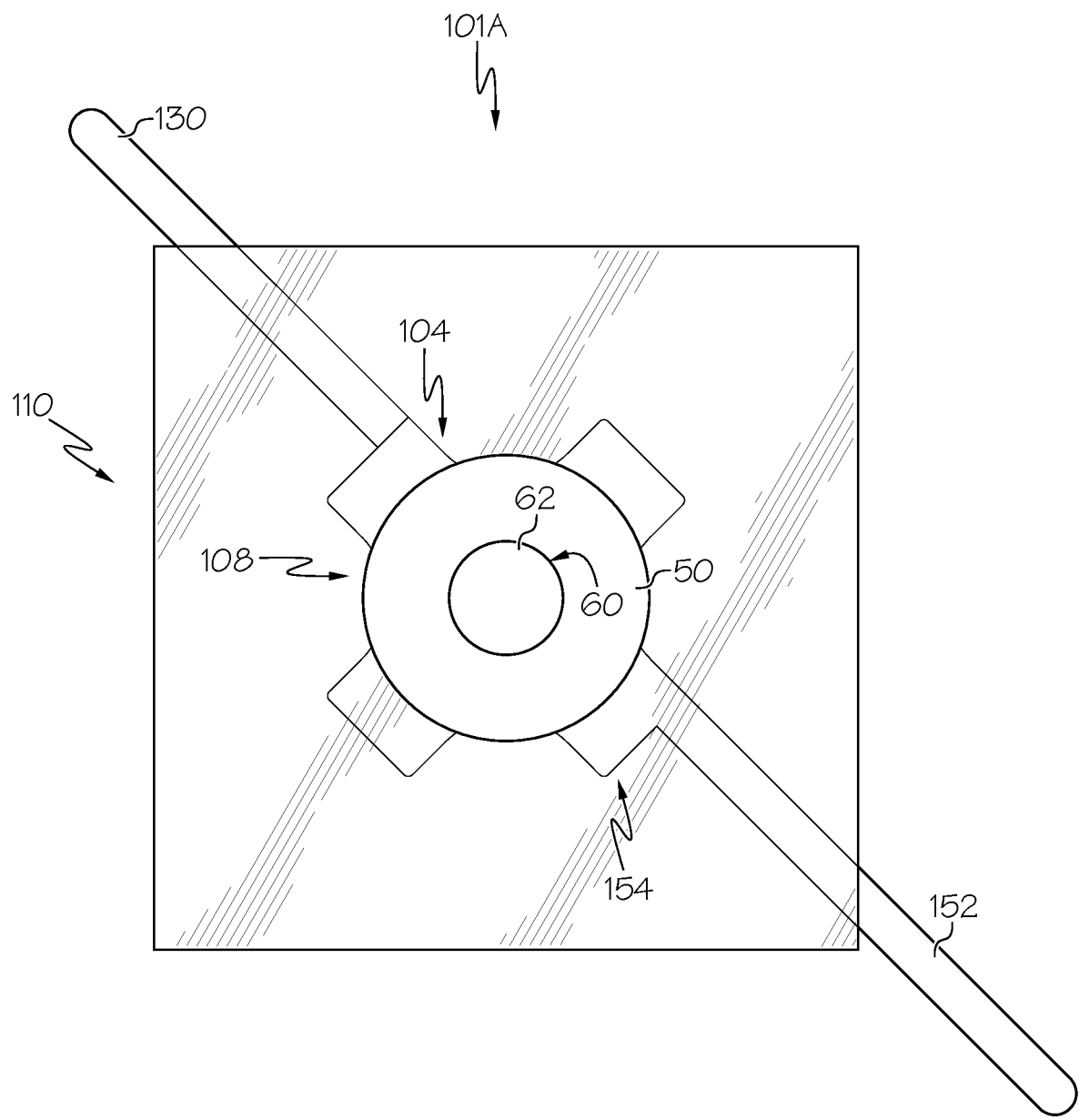
FIG. 6 schematically depicts an illustrative artificial muscle of the seat of FIGS. 1A-4 and seat liner of FIG. 5 with a sensor coupled to the illustrative artificial muscle, according to one or more embodiments shown and described herein.

Referring now to FIGS. 2 and 6, a plurality of artificial muscles 101, including artificial muscles 101A-101F, are positioned within the cavity 15 of the seat 10. The cavity 15 of the seat 10 may include a plurality of stacks of artificial muscles. More specifically, the seat 10 may include stacks 102A, 102B, 102C, and 102D of artificial muscles 101. A "stack," as used herein, generally refers to an overlapping relationship between a plurality of artificial muscles 101 throughout the depth (e.g. in the direction of the z axis of the coordinate axes of FIG. 2) of the cavity 15. While the seat 10 is depicted including four stacks 102A-D of artificial muscles 101, it should be appreciated that the seat 10 may include any desirable number of stacks of artificial muscles 101. The seat 10 may include stacks of artificial muscles 101 over the entire length (e.g. in the y direction of the coordinate axes of FIG. 2) and width (e.g. in the x direction of the coordinate axes of FIG. 2) of the seat 10. Accordingly, the number of stacks of artificial muscles 101 in the seat 10 may depend on the perimeter and dimensions of the upper surface 20 of the seat 10 and the dimensions of the artificial muscles 101 employed in the seat 10. For instance, the stacks of artificial muscles 101 may be considered to be in an array throughout the cavity 15 of the seat 10. While the array of stacks 102A-D of artificial muscles are depicted in a 1×4 array in FIG. 2, depending on the perimeter and dimensions of the upper surface 20 of the seat 10, the array of stacks 102A-D of artificial muscles may be arranged in a 2×4 or 1×3 array, for instance. However, as explained in further detail below, in some embodiments, the stacks of artificial muscles 101 need not span the entire upper surface 20 of the seat 10. For instance, the stacks of artificial muscles 101 may be randomly positioned or positioned based on specific ergonomic needs across the surface area of the upper surface 20 of the seat. In such embodiments, there may be portions within the cavity 15 void of artificial muscles 101. Or put another way, there may be portions of the upper surface 20 of the seat 10 that are not loaded with artificial muscles 101. In some embodiments, as will be described further with respect to FIG. 4, the seat 10 may include a single layer of artificial muscles 101. In other words, the artificial muscles 101 of the seat 10 may not be arranged in stacks of a plurality of artificial muscles 101 that traverse a depth of the cavity 15.

Still referring to FIGS. 2 and 6, a pressure sensor 62 may be disposed in the cavity 15, for example, coupled to the artificial muscle 101. The pressure sensor 62 is coupled to a housing 110 of the artificial muscle 101. In some embodiments, the artificial muscle 101 may include a plurality of pressure sensors 62. It should be appreciated any or all of the artificial muscles 101 in the cavity 15 may include a pressure sensor 62. For instance, in some embodiments, artificial muscles 101A-101C in the stack 102D may each include pressure sensors 62. In some embodiments, the uppermost artificial muscle 101 of each stack 102A-102D of artificial muscles, including the artificial muscle 101A and artificial muscle 101D, may include a pressure sensor 62. Indeed, in some embodiments, every artificial muscle 101 within the cavity 15 of the seat 10 may include a pressure sensor 62. In some embodiments, the pressure sensor 62 may be of any suitable type, such as, by way of non-limiting example, absolute, gauge, or differential pressure sensors. Sensing by the pressure sensor 62 may include any suitable technique such as resistive sensing, capacitive sensing, piezoelectric sensing, optical sensing, micro electro-mechanical system (MEMS), or any other suitable type of pressure sensing technique. Output from the pressure sensor 62 may be by millivolt-output transducers, volt-output transducers, transmitters, or any other suitable components.

In operation, the pressure sensor 62 may measure the pressure applied by the artificial muscle 101 and/or a stack 102A-102D of artificial muscles to the upper surface 20 of the seat 10, and therefore to the body part 8 of the user 3 (FIG. 1B) positioned on the seat 10. In some embodiments, the pressure sensors 62 may be disposed in the cavity 15 without being coupled to individual artificial muscles 101. For example, in some embodiments, the pressure sensors 62 may be coupled to the inner surface 21 of the upper surface 20 and the inner surface 16 of the lower surface 14 of the seat 10. While the pressure sensor 62 is primarily described herein, it should be appreciated that the artificial muscle 101 may include any number of sensors to gather a variety of information on the internal environment of the seat 10, or the environment between the seat 10 and the body part 8.

Still referring to FIGS. 2 and 6, in some embodiments the pressure sensor 62 may be coupled to a housing 110 of an individual artificial muscle 101 in alignment with the expandable fluid region 196 (FIGS. 8-12) of the housing 110. Thus, the individual pressure sensor 62 can measure the pressure applied by the expandable fluid region 196 of the artificial muscle 101 to the upper surface 20 of the seat 10 and thus applied to the body part 8 when the artificial muscle 101 is actuated. Furthermore, the one or more pressure sensors 62 may measure the pressure applied by the upper surface 20 of the seat 10 to the body part 8 at one or more locations along the upper surface 20.

Figure 3:
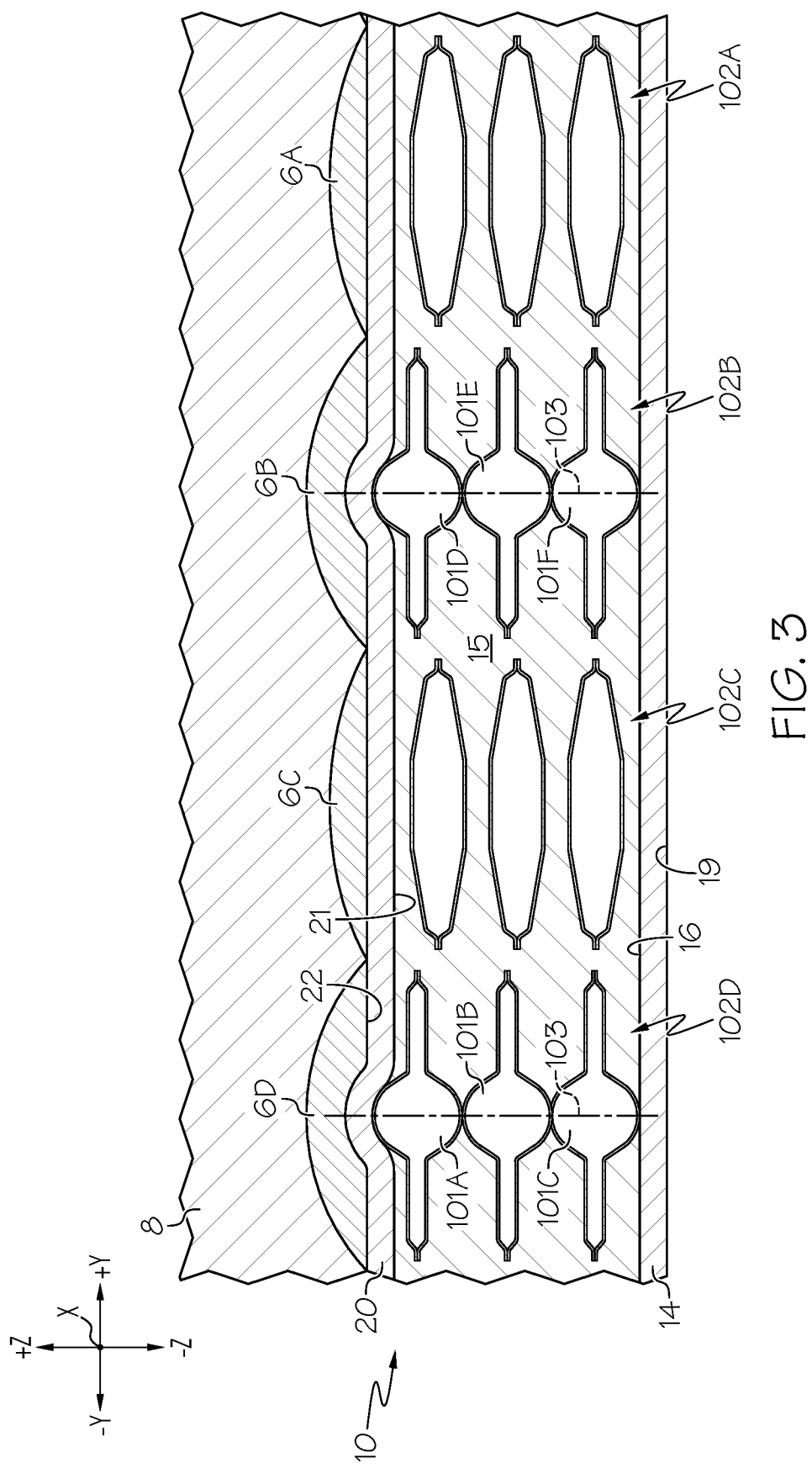
FIG. 3 schematically depicts a cross section of the seat of FIG. 1B supporting a user and in an actuated state, according to one or more embodiments shown and described herein.

Referring now to FIGS. 2, 3, and 6, in operation, each of the artificial muscles 101 may be independently actuatable to apply selective pressure to the upper surface 20 of the seat 10 in response to one or more pressure measurements by the plurality of pressure sensors 62. For example, the pressure sensors 62 may measure a pressure applied to one or more locations of the upper surface 20 of the seat 10 using the one or more pressure sensors 62 and actuate the plurality of artificial muscles 101 in a selective manner to apply selective pressure to the upper surface 20 of the seat 10 in response to the pressure measurements by the one or more pressure sensors 62 at the one or more locations of the upper surface 20 of the seat 10. In other words, the artificial muscles 101 may be selectively actuated to achieve a desired pressure based on the data gathered by the pressure sensors 62. In some embodiments, each stack 102A-D of artificial muscles may be independently actuatable to apply selective pressure to the upper surface 20 of the seat 10 in response to one or more pressure measurements by the plurality of pressure sensors 62. For example, each artificial muscle 101D-F of the stack 102B of artificial muscles may be simultaneously actuated while the artificial muscles of the stacks 102A, 102C, and 102D of artificial muscles remain in a non-actuated state. Furthermore, actuation of each of the plurality of artificial muscles 101 may be controlled by an actuation system 400 (FIG. 16), which may include components housed in an onboard control unit 40 (FIG. 16) coupled to the seat 10.

Still referring to FIGS. 2, 3, and 6 a cross section of the seat 10 in a non-actuated state (FIG. 2) and an actuated state (FIG. 3) is depicted. The outer surface 22 of the upper surface 20 contacts the body part 8 of the user 3 (FIG. 1B). The upper surface 20, and particularly the outer surface 22, may be made of a soft, compliant, or elastic material that is able to conform to the body part 8 of the user 3 (FIG. 1B). The upper surface 20 may further be filled with a gel, liquid, or other material to enhance the compliance of the upper surface 20 and the ability of the upper surface 20 to comfortably conform to the body part 8 of the user 3 (FIG. 1B). The inner surface 21 of the upper surface 20 may additionally be made of a soft, compliant, or elastic material to enhance the ability of the upper surface 20 to conform to the body part 8. The inner surface 21 of the upper surface 20 may contact at least one artificial muscle 101 of the seat 10. The lower surface 14 may comprise the soft, compliant, or elastic material of the upper surface 20 or may comprise a more rigid material than the upper surface 20, such as a rigid plastic, polymeric material, or a metal. The lower surface 14 may remain rigid to provide a surface for the artificial muscles to push upwardly from. The lower surface 14, as a rigid material, may also provide a suitable surface for coupling the seat 10 to a mechanical support, such as a bike frame. In some embodiments, the entire seat 10, including the upper surface 20 and the lower surface 14, may comprise a non-absorbent material. Using a non-absorbent material facilitates ease of cleaning the seat 10 and reduces possible damage or wear to the seat 10 or artificial muscles 101 within the seat 10 from weather or other external environments.

As depicted in FIGS. 2 and 3, and with additional reference to FIG. 6, a plurality of artificial muscles 101 are disposed throughout the cavity 15 of the seat 10. More specifically, the cavity 15 includes the stacks 102A, 102B, 102C, and 102D of artificial muscles. Each stack 102A-D of artificial muscles is shown to include a depth (e.g. in the z direction of the coordinate axes of FIGS. 2 and 3) of three artificial muscles. For instance, the stack 102D includes artificial muscles 101A, 101B, and 101C, and the stack 102B includes the artificial muscles 101D, 101E, and 101F. However, as explained above, the stacks 102A-D of artificial muscles may include any number of artificial muscles 101 throughout the depths of the stacks 102A-D. More particularly, the number of artificial muscles 101 in each stack 102A-D may be dependent on the particular use and application of the seat 10. For instance, the seat 10 may include a different depth of artificial muscles 101 depending on whether the seat 10 were incorporated in a vehicle seat or a bike seat and depending on the anticipated pressures between the user 3 (FIG. 1B) and the seat 10. Moreover, when implemented as a bike seat, the seat 10 may include a different depth of artificial muscles 101 depending on whether the bike 4 (FIG. 1B) is a mountain bike or a road bike, for instance, as the user 3 (FIG. 1B) may experience markedly different physical effects from the seat 10 depending on the operation of the bike 4 (FIG. 1B). Similarly, the depth of artificial muscles 101 throughout the seat 10 may be dependent on the anatomy of a specific user 3 (FIG. 1B) of the seat 10. Weight, height, age, underlying health conditions, past or present injuries, and the like of the user 3 (FIG. 1B) may determine a desirable depth of artificial muscles 101 in the seat 10 to optimize user comfort.

Similarly, while four stacks 102A-D of artificial muscles are depicted along the length (e.g. in the y direction of the coordinate axes of FIG. 2) of the seat 10, it should be appreciated that any number of stacks may be disposed along the length of the seat 10. It should also be appreciated that a plurality of stacks of artificial muscles 101 may further be located across the width (e.g. in the x direction of the coordinate axes of FIG. 2) of the seat 10. Accordingly, an array of stacks of artificial muscles may span the entire outer surface 22 of the upper surface 20. In other embodiments, stacks of artificial muscles 101 may be located at select lengthwise (e.g. in the y direction of the coordinate axes of FIG. 1A) and/or widthwise (e.g. in the x direction of the coordinate axes of FIG. 1A) locations of the upper surface 20, either in a uniform or non-uniform array. More specifically, position and/or depth of the stacks of artificial muscles may vary depending on the anticipated positioning of the body part 8 of the user 3 (FIG. 1B) on the seat 10, and particularly based on anticipated high pressure point areas between the upper surface 20 of the seat 10 and the body part 8. That is, a greater number of stacks of artificial muscles or a greater depth of stacks of artificial muscles may be included at regions of the seat 10 expected to have substantial contact, in terms of length of time or maximum pressure applied, with the body part 8. Therefore, the positioning of the artificial muscles 101 and stacks of artificial muscles 101 in the seat 10 may be based on ergonomics, either user-specific or based on a larger population, to increase user comfort on the seat 10.

The plurality of artificial muscles 101 each include an electrode pair 104 disposed in a housing 110 together with a dielectric fluid 198 (FIGS. 7-12). The electrode pair 104 is disposed in an electrode region 194 of the housing 110, adjacent an expandable fluid region 196. In operation, voltage may be applied to the electrode pair 104, drawing the electrode pair 104 together, which directs dielectric fluid into the expandable fluid region 196, expanding the expandable fluid region 196. In operation, the seat 10 is operable to apply selective pressure to the user 3 (FIG. 1B) by actuation of one or more of the plurality of artificial muscles 101. To actuate the seat 10, voltage may be selectively applied to the one or more artificial muscles 101, expanding the expandable fluid regions 196 of the actuated artificial muscles 101. In some embodiments, each of the plurality of artificial muscles 101 are independently actuatable to apply selective pressure to the upper surface 20 of the seat 10 which may apply pressure to the body part 8 of the user 3 (FIG. 1B) when the seat 10 is at least partially supporting the weight of the user 3 (FIG. 1B). As will be discussed further below, depending on the magnitude of the voltage applied to each of the artificial muscles 101, the degree of actuation and pressure applied by the artificial muscles 101 may vary. In some embodiments, the expandable fluid region 196 of each artificial muscle 101 of each of the plurality of artificial muscle stacks 102A-D are coaxially aligned with one another. However, in other embodiments, there may be some offset between the expandable fluid region 196 of at least some of the artificial muscles of the plurality of artificial muscles stacks 102A-D.

Referring now to FIG. 3, each artificial muscle 101 of a stack of artificial muscles may be simultaneously and collectively actuated. In such embodiments, when a stack of artificial muscles is actuated, each artificial muscle 101 of the actuated stack may be actuated identically or to the same degree. In the illustrative example of FIG. 3, the stack 102D of artificial muscles is actuated and thus, the artificial muscles 101A, 101B, and 101C are actuated. The dielectric fluid 198 directed into the expandable fluid region 196 expands the expandable fluid region 196 of each artificial muscle 101A, 101B, and 101C (FIGS. 7-12). Therefore, the height (e.g. in the z direction of the coordinate axes of FIG. 3) of each artificial muscle 101A, 101B, and 101C, and therefore of the entire stack 102D of artificial muscles increases. As depicted in FIG. 3, the expandable fluid regions 196 of each artificial muscle 101A, 101B, and 101C of the stack 102D are coaxially aligned such that the axis of alignment 103 between the expandable fluid regions of the artificial muscles 101A, 101B, and 101C is substantially normal to the upper surface 20 of the seat 10 and the body part 8. Therefore, despite possible contours designed at specific points in the seat 10, and particularly the upper surface 20 of the seat 10, the stack 102D of artificial muscles may be positioned such that the axis of alignment 103 between the expandable fluid regions of the artificial muscles 101A, 101B, and 101C is normal to the upper surface 20 and the body part 8. When actuated, the stack 102D of artificial muscles, and more particularly the uppermost artificial muscle of the stack 102D, artificial muscle 101A, applies a pressure to the upper surface 20, and specifically the inner surface 21 of the upper surface 20 of the seat 10. Accordingly, the actuation of the stack 102D of artificial muscles applies a pressure to a portion 6D of the body part 8 positioned above (e.g. in the +z direction of the coordinate axes of FIG. 3) or aligned with the stack 102D of artificial muscles.

In the illustrative example of FIG. 3, the stack 102B of artificial muscles is also actuated and thus the artificial muscles 101D, 101E, and 101F are actuated. When actuated, dielectric fluid 198 is directed into the expandable fluid region 196, expanding the expandable fluid region 196 of each artificial muscle 101D, 101E, and 101F (FIGS. 7-12). Therefore, the height (e.g. in the z direction of the coordinate axes of FIG. 3) of each of each artificial muscle 101D, 101E, and 101F, and therefore of the entire stack 102B of artificial muscles increases. The expandable fluid regions 196 of each artificial muscle 101D, 101E, and 101F of the stack 102B are coaxially aligned such that the axis of alignment 103 between the expandable fluid regions 196 of the artificial muscles 101D, 101E, and 101F is substantially normal to the upper surface 20 and the body part 8. The stack 102B of artificial muscles, and more particularly the uppermost artificial muscle of the stack 102B, artificial muscle 101D, applies a pressure to the upper surface 20, and specifically the inner surface 21 of the upper surface 20 of the seat 10. Accordingly, the actuation of the stack 102B of artificial muscles applies a pressure to a portion 6B of the body part 8 positioned above (e.g. in the +z direction of the coordinate axes of FIG. 3) or aligned with the stack 102B of artificial muscles.

In some embodiments in which each artificial muscle 101 of a stack of artificial muscles may be simultaneously and collectively actuated, each artificial muscle 101 of the actuated stack need not be identically actuated to the same degree. With reference to stack 102D of artificial muscles 101A-C, for instance, if the stack 102D is actuated, the artificial muscles 101A-C in the stack 102D are actuated. However, the artificial muscle 101A may be actuated to a first degree, the artificial muscle 101B may be actuated to a second degree, and the artificial muscle 101C may be actuated to a third degree. In FIG. 3, the stacks 102C and 102A of artificial muscles remain in a non-actuated state, illustrating that each stack 102 of artificial muscles may operate independent of one another.

While embodiments have been described wherein the artificial muscles 101 of each stack 102A-D of artificial muscles are aligned, or more specifically the expandable fluid regions 196 of the artificial muscles 101 are coaxially aligned such that the axes of alignment between the expandable fluid regions 196 of the artificial muscles 101 of each stack 102A-D are substantially normal to the upper surface 20 and the body part 8, it should be appreciated that embodiments are also contemplated where the expandable fluid regions 196 of the artificial muscles 101 are not coaxially aligned. In other words, the artificial muscles 101 of each stack 102A-D may be in an offset, overlapping arrangement. This offset, overlapping arrangement is such that the expandable fluid regions 196 of the artificial muscles 101A-C in the stack 102D, for instance, are offset from each other. In other embodiments, a subset of the artificial muscles 101 of each stack 102A-D may remain coaxially aligned. For example, the expandable fluid regions 196 of the artificial muscles 101A and 101C may remain coaxially aligned, while the expandable fluid region of the artificial muscle 101B may be offset from the axis of alignment between the artificial muscles 101A and 101C.

In operation, a user may selectively actuate particular stacks of artificial muscles through the actuation system 400 (FIG. 16). It should be appreciated that a user who selectively actuates the artificial muscles of the seat 10 may be the user 3 (FIG. 1B) resting at least a portion of her bodyweight on the seat 10, or a remote user that is not resting at least a portion of her bodyweight on the seat 10. The remote user may be a physician or physical trainer, for instance. A user may select a desired pressure for each stack 102A-D to independently apply to the body part 8. For instance, the stack 102D may apply a first pressure to the portion 6D of the body part 8, the stack 102C may apply a second pressure to a portion 6C of the body part 8, the stack 102B may apply a third pressure to the portion 6B of the body part 8, and the stack 102A may apply a fourth pressure to the portion 6A of the body part 8. In some embodiments, a user may select a plurality of stacks of artificial muscles to actuate to the same degree and therefore apply the same pressure to the body part 8. For instance, a user may wish a constant pressure to be applied along a select length (e.g. in the y direction of the coordinate axes FIG. 3) of the body part 8 and therefore the seat 10. In such embodiments, each of the stacks 102A-D, for instance, may be actuated to apply identical pressures to the body part 8. Similarly, a user may wish a constant pressure to be applied along a select width (e.g. in the x direction of the coordinate axes of FIG. 3) of the body part 8 and therefore the seat 10. In such embodiments, the stack 102D, for instance, and additional stacks of artificial muscles aligned with the stack 102D in the x direction of the coordinate axes of FIG. 3 may be actuated to apply identical pressures to the body part 8. A user may be supplied with a graphical display of the seat 10 and/or specific coordinate locations of each of the stacks of artificial muscles in the seat 10 to assist the user in selecting specific stacks of artificial muscles to actuate.

A user may also actuate the stacks 102A-102D of artificial muscles in any desired pattern. For instance, a user may select for the seat 10 to massage the body part 8. In such cases, the actuation of the plurality of stacks 102A-D of artificial muscles may occur in rippling flows for a general massage effect. Indeed, the plurality of stacks 102A-D of artificial muscles may be actuated in a cascading, patterned, stochastic, or uniform rhythm. Accordingly, a massage pattern or operation of actuation may include any mode of operation in which the pressure applied to the upper surface 20 and body part 8 is temporally, spatially, or otherwise patterned (as opposed to maintaining or applying a constant pressure at the various points of the upper surface 20). Such massaging operations may remedy itches, stiffness, and/or soreness that the user 3 (FIG. 1B) experiences along the body part 8.

The one or more pressure sensors 62 attached to a plurality of the artificial muscles 101 provide a user with a readout of the pressure presently applied by each stack 102A-D of artificial muscles to the portions 6A-6D of the body part 8, respectively. Accordingly, the user may decisively select an updated pressure for each stack 102A-D to respectively apply to the body part 8. Accordingly, the user's decision to increase or decrease pressure applied by the seat 10 along the body part 8 may be based on quantitative data instead of, or in addition to, a qualitative assessment of the user 3 (FIG. 1B) of the pressures being applied to the body part 8. For instance, through a user interface displaying data from the one or more pressure sensors 62, the user may identify a particular stack that is applying a pressure that is either greater or lesser than a desired pressure, and then selectively adjust the actuation of the stack to apply a known, quantitative pressure to the body part 8.

The pressure sensors 62 may also allow the seat 10 to operate in a constant feedback loop. For instance, a user may want to maintain a constant pressure applied to the body part 8. Due to localized swelling in the body part 8 or a specific body positioning resulting in a particular distribution of the weight of the user 3 (FIG. 1B) to the seat 10, the pressure between the seat 10 and the body part 8 may exceed a desired pressure in localized areas. For instance, with respect to FIG. 3, the body part 8 may swell at portions 6C and 6A. The portions 6C and 6A may also be supporting a larger share of the body weight of the user 3 (FIG. 1B) compared to the portions 6B and 6D. In response to such swelling or body weight distribution, the pressure applied to the portions 6C and 6A of the body part 8, as measured by the one or more pressure sensors, may exceed a desired pressure limit. Therefore, in response to such swelling or weight distribution, the stacks 102C and 102A may be relaxed or enter a non-actuated (as depicted in FIG. 3) or a lesser-actuated state to reduce the pressure on the portions 6C and 6A of the body part 8 until a desirable pressure is achieved at the portions 6C and 6A. Alternatively, to effectively reduce the amount of pressure applied to the portions 6C and 6A, the stacks 102C and 102A may remain at a constant level of actuation, and the stacks 102D and 102B may increase in level of actuation. In doing so, the pressure applied to the portions 6D and 6B may increase and/or the height of the seat 10 may increase (e.g. in the +z direction of the coordinate axes of FIG. 3) above the stacks 102D and 102B, thereby reducing the pressure locally applied to the portion 6C and 6A from the seat 10.

Conceptually, the pressure may be maintained by adjusting the force delivered to body part 8 from the seat 10, or by adjusting the contact area between the body part 8 and the seat 10. Therefore, as described in the preceding paragraph, the selective actuation of the stacks of artificial muscles 101 may result in a more complete conformity of the seat 10 to the body part 8, thereby dispersing forces over an increased contact area and reducing the pressure applied to the body part 8. For instance, based on the positioning of the user 3 (FIG. 1B), the portion 6C may be a local pressure point. That is, a large portion of the weight of the user 3 (FIG. 1B) may be applied to the seat 10 at the portion 6C, and result in similarly high reaction forces from the seat 10 to the portion 6C. Simultaneously, the portions 6D and 6B of the body part 8 may be in minimal contact with the seat 10, thereby resulting in minimal reaction forces being applied from the seat 10 to the portions 6D and 6B. By inflating the stacks 102D and 102B beneath the portions 6D and 6B, contact between the seat 10 and the portions 6D and 6B of the body part 8 may be increased. That is, the seat 10 may be raised to meet the portions 6D and 6B of the body part 8. In doing so, the body weight of the user 3 (FIG. 1B) may be more fully distributed across the seat 10. That is, the large portion of body weight that was initially locally applied to the portion 6C, resulting in high pressures on the portion 6C of the body part 8, may be dispersed over an increased area, the portions 6D, 6C, and 6B. Therefore, the pressure applied to the portion 6C will decrease and the pressure applied to the portions 6D and 6B will increase. Additional stacks of artificial muscles 101 may be actuated upwardly or downwardly until no single portion of the body part 8 contacting the seat 10 experiences an undesirably high pressure. Generally then, the selective actuation of the artificial muscles 101 in the seat 10 allow for increased conformity of the upper surface 20 of the seat 10 to the body part 8, and such increased conformity may result in a more even distribution of body weight across the seat 10, thereby reducing undesirably high localized pressures on the body part 8.

The controller 50 of the actuation system 400 (FIG. 16) may control the described feedback loop operations. For instance, a user may first select a desired pressure to be maintained, or a maximum pressure not be exceeded, between the body part 8 and the seat 10. In other embodiments, the actuation system may be configured to determine the desired pressure based on user body type, a self-reported injury or health characteristic, specific application/use of the seat 10, expected or measured time spent in the seat 10 by the user 3 (FIG. 1B), and/or any other relevant factor. The actuation system 400 may determine a first or initial pressure value applied to the upper surface 20 by the artificial muscles 101 from one or more pressure sensors 62. By comparing the initial pressure value with the desired pressure value, the actuation system 400 may then modify actuation of one or more artificial muscles 101 to change the pressure applied from the artificial muscles 101 to the upper surface 20 and apply the desired pressure to the body part 8.

While embodiments have been discussed wherein each artificial muscle 101 of a stack of artificial muscles is identically and simultaneously actuated, it should be appreciated that in some embodiments, individual artificial muscles 101 may be selectively actuated. More specifically, any artificial muscle 101 in the seat 10 may be actuated, and actuated to a specific degree, independent of any other artificial muscle 101 in the seat 10. For instance, with respect to the stack 102D of artificial muscles, each artificial muscle 101A, 101B, and 101C in the stack 102D may be independently actuated. Accordingly, the displacement of the stack 102D and the pressure applied by the stack 102D to the portion 6D of the body part 8 may be altered by the number of artificial muscles of the stack 102D that are actuated. In other words, the artificial muscle 101C may be actuated to a specific degree, while the artificial muscles 101A and 101B may remain in a non-actuated state. In additional embodiments, the artificial muscles 101 may not arranged in stacks, but instead the artificial muscles 101 may be randomly arranged throughout a depth of the seat or arranged in multiple layers that do not substantially align or overlap to form linear stacks of artificial muscles throughout a depth of the seat 10.

Figure 4:
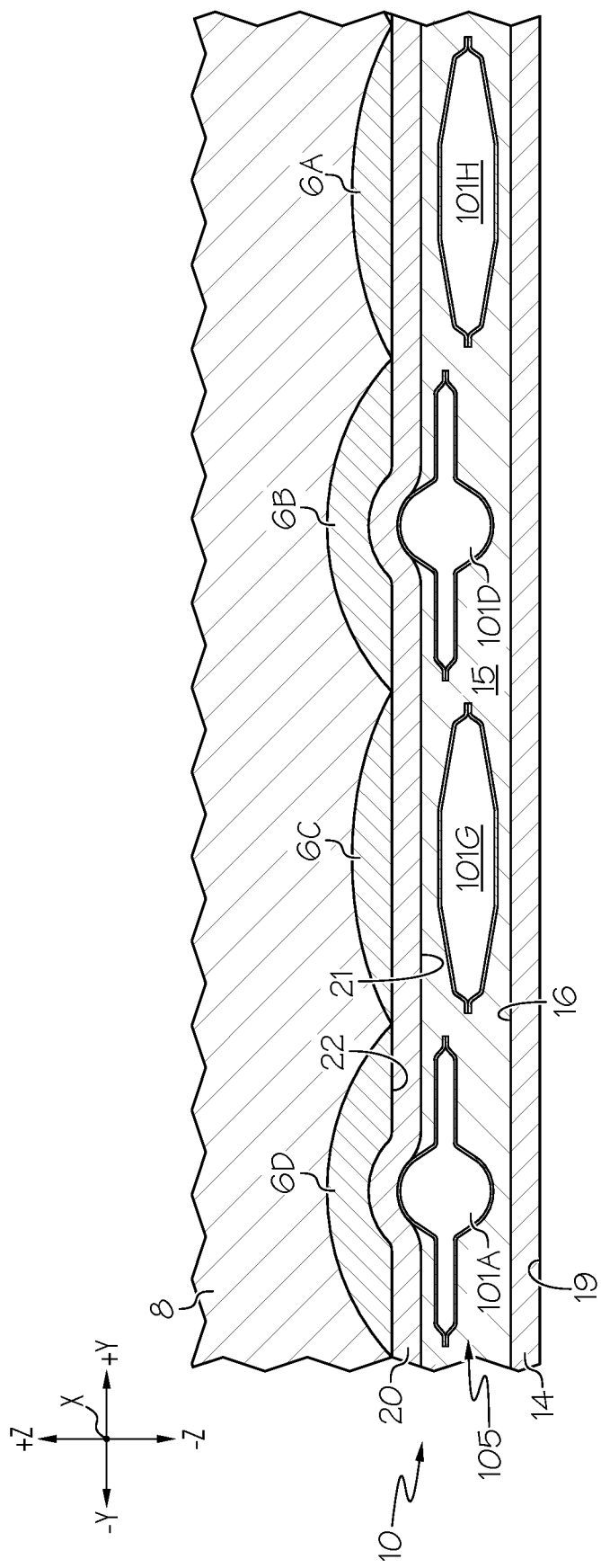
FIG. 4 schematically depicts a cross section of the seat of FIG. 1B supporting a user and in an actuated state, according to one or more embodiments shown and described herein.

Referring now to FIG. 4, with additional reference to FIG. 6, a cross section of the seat 10 including a monolayer 105 of artificial muscles 101 is depicted. It should be readily appreciated that the monolayer 105 may function similarly to the stacks 102A-D discussed with references to FIGS. 2 and 3. That is, each artificial muscle 101A, 101G, 101D, and 101H in the monolayer 105 may function as if it were a 1×1 "stack." For instance, each artificial muscle 101 in the monolayer 105 may be actuated independently of the remaining artificial muscles 101 in the monolayer 105, a group of artificial muscles 101 in the monolayer 105 may be actuated simultaneously depending on the positioning of the group in relation to the length and/or width of the outer surface 22 of the upper surface 20, and the monolayer 105 of artificial muscles 101 may be actuated in a massage pattern. Similarly, as discussed with reference to FIGS. 2 and 3, each artificial muscle 101 in the monolayer 105 may be actuated based on user input or a constant feedback loop based on outputs from the pressure sensors 62. Moreover, the positioning or distribution of the artificial muscles 101 in the monolayer may be dependent on the size and shape of the seat 10, user characteristics, ergonomic objectives, and the like, discussed above.

Figure 5:
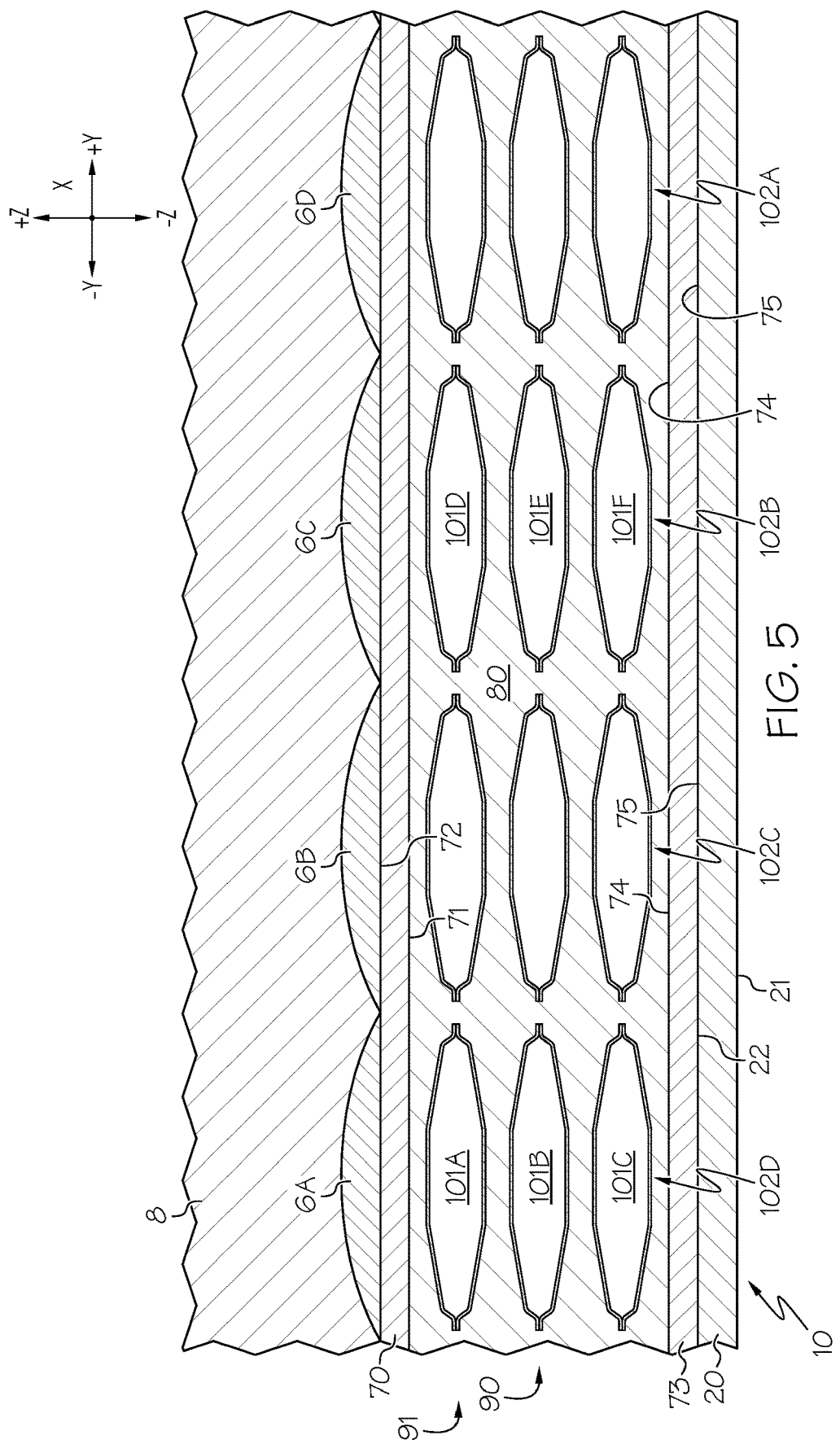
FIG. 5 schematically depicts a seat liner coupled to the seat of FIG. 1B and supporting a user in a non-actuated state, according to one or more embodiments shown and described herein.

Referring now to FIG. 5, with additional reference to FIG. 6, a cross section of a liner 90 for the seat 10 is depicted. The liner 90 may be a cover or removable attachment to the upper surface 20 of the seat 10. For instance the liner 90 may include an elastic skirt that may wrap around the perimeter of the seat 10 to removably couple the liner 90 to the seat 10. The liner 90 may also be removably coupled to the seat 10 by any other desirable attachment, such as hook and loop fasteners, re-usable adhesive, and the like. The liner 90 and seat 10 combination may be referred to as a seat assembly 91. The liner 90 may be selectively used to modify the seat 10, particularly in embodiments where the seat 10 does not include the cavity 15 (FIG. 2) containing one or more artificial muscles 101. For instance, the liner 90 may be used to modify a traditional bike seat that is not loaded with artificial muscles and may cause the user 3 (FIG. 1B) discomfort. The liner 90 includes an upper surface 70, a lower surface 73, and a cavity 80 disposed therebetween. The lower surface 73 includes an inner surface 74 and an outer surface 75. The upper surface 70 includes an inner surface 71 and an outer surface 72. The cavity 80 is positioned within the liner 90, disposed between the inner surface 74 of the lower surface 73 and the inner surface 71 of the upper surface 70 of the liner 90. It should be appreciated, however, that in some embodiments, one or both of the upper surface 70 and the lower surface 73 may include only an outer surface. That is, the upper surface 70 may include the outer surface 72 without the inner surface 71, and the lower surface 73 may include the outer surface 75 without the inner surface 74. Therefore, in embodiments, the cavity 80 may be disposed between any combination of the outer surface 72 or inner surface 71 of the upper surface 70 and the outer surface 75 or the inner surface 74 of the lower surface 73, depending on the particular configurations of the upper surface 70 and the lower surface 73. When the liner 90 is coupled to the seat 10, the lower surface 73 of the liner 90 may be supported by the upper surface 20 of the seat 10.

When applied to the seat 10, the liner 90 becomes the component of the seat assembly 91 that directly interacts with or contacts the user 3 (FIG. 1B) when at least a portion of the body weight of the user 3 (FIG. 1B) is supported by the seat assembly 91. Accordingly, the materials of the upper surface 70 of the liner 90 may resemble the material properties of the upper surface 20 of the seat 10 discussed above. Similar to the seat 10, as discussed with references to FIGS. 2-4, the liner 90 may include one or more artificial muscles 101 in the cavity 80. The artificial muscles 101 of the liner 90 may take any of the arrangements or distributions discussed above with references to FIGS. 2-4. For example, the artificial muscles 101 may be positioned in the cavity 80 as stacks 102A-102D or as a monolayer. Similarly, the distribution of the artificial muscles 101, across the surface area of the upper surface 70 of the liner 90 or through the depth of the liner 90, in the cavity 80 may be determined by the size/shape of the liner 90, characteristics and preferences of the user 3 (FIG. 1B), ergonomic considerations, and the like, discussed above with reference to FIGS. 2-4. Moreover, the operation of the liner 90 will largely mirror that of the seat 10, as discussed with reference to FIGS. 2-4. For instance, each artificial muscle 101 in the liner 90 may be actuated independently of the remaining artificial muscles 101 in the liner 90, each artificial muscle 101 in a stack may be actuated simultaneously, a group of artificial muscles 101 in the monolayer 105 may be actuated simultaneously depending on the positioning of the group in relation to the length and/or width of the outer surface 72 of the upper surface 70, and the artificial muscles 101 may be actuated in a massage pattern. Depending on the actuation of the artificial muscles 101 in the cavity, the artificial muscles 101 may apply select pressures to the upper surface 70 of the liner 90, and therefore, the body part 8 of the user 3 (FIG. 1B). The pressure actuation of the artificial muscles may be actively controlled by a user or adjusted through a constant feedback loop, as discussed above. Therefore, it should be appreciated that discussion related to the actuation or operation of the seat 10 is similarly applicable to the liner 90 of the seat assembly 91.

Figure 7:
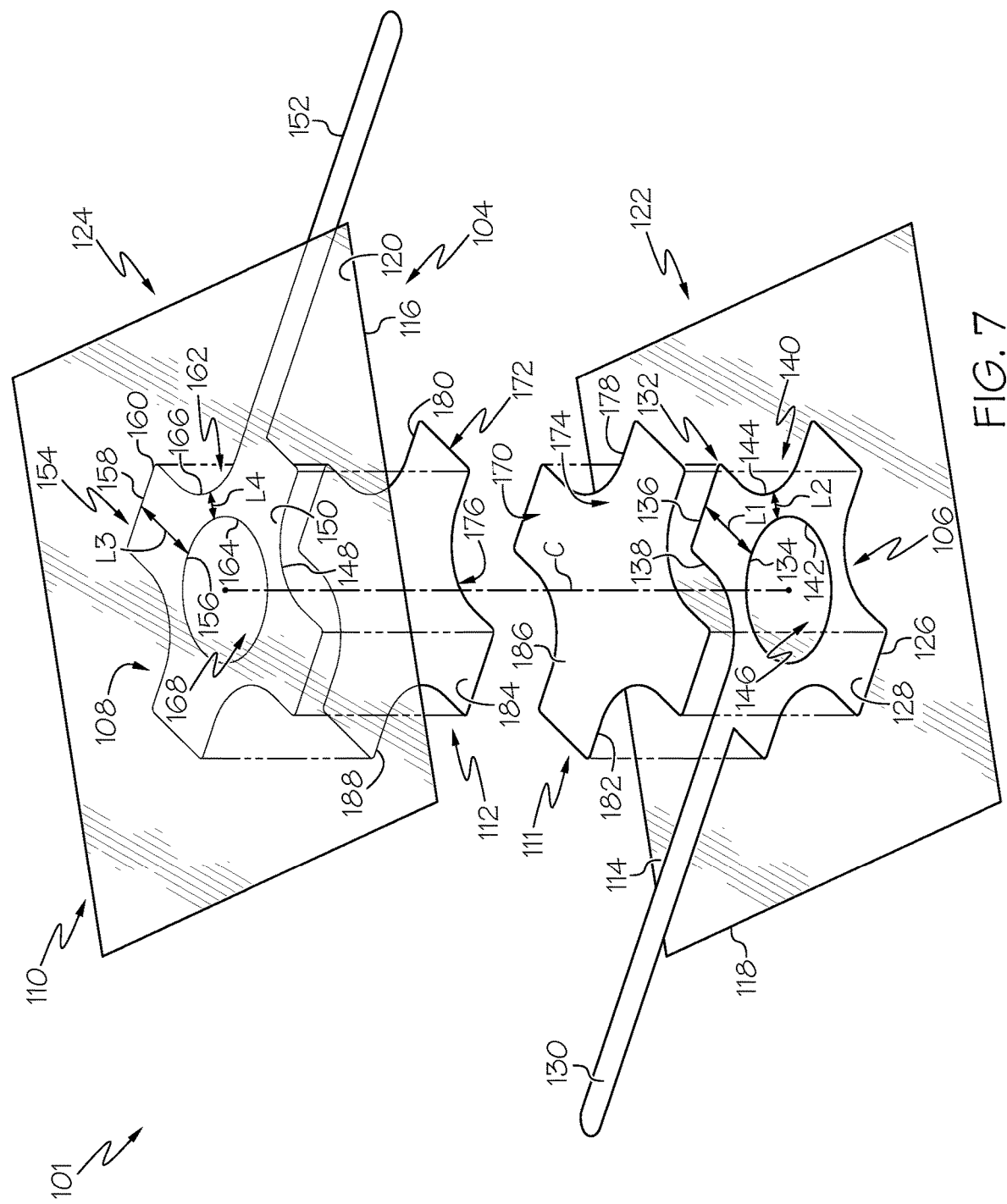
FIG. 7 schematically depicts an exploded view of an illustrative artificial muscle of the seat of FIGS. 1A-4 and seat liner of FIG. 5, according to one or more embodiments shown and described herein.

Referring now to FIGS. 6 and 7, an example individual artificial muscle 101 of the plurality of artificial muscles of the seat 10 or seat assembly 91 is depicted in more detail. The artificial muscle 101 includes the housing 110, the electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 101 is negatively charged.

Figure 11:
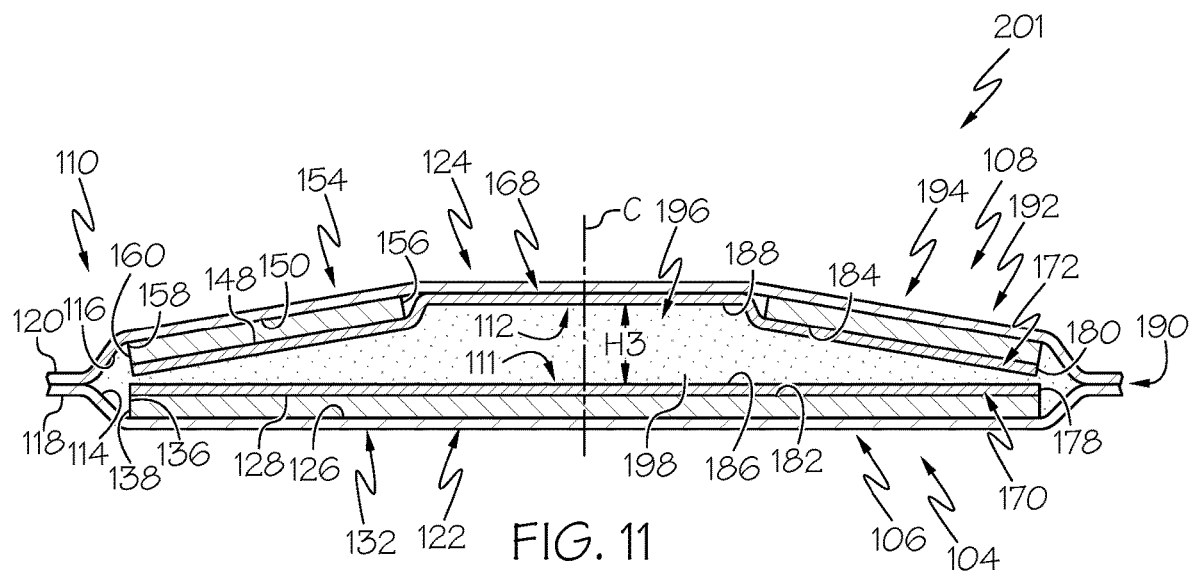
FIG. 11 schematically depicts a cross-sectional view of another illustrative artificial muscle in a non-actuated state, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 400, as shown in FIG. 11. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 400 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIG. 7, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

Figure 8:
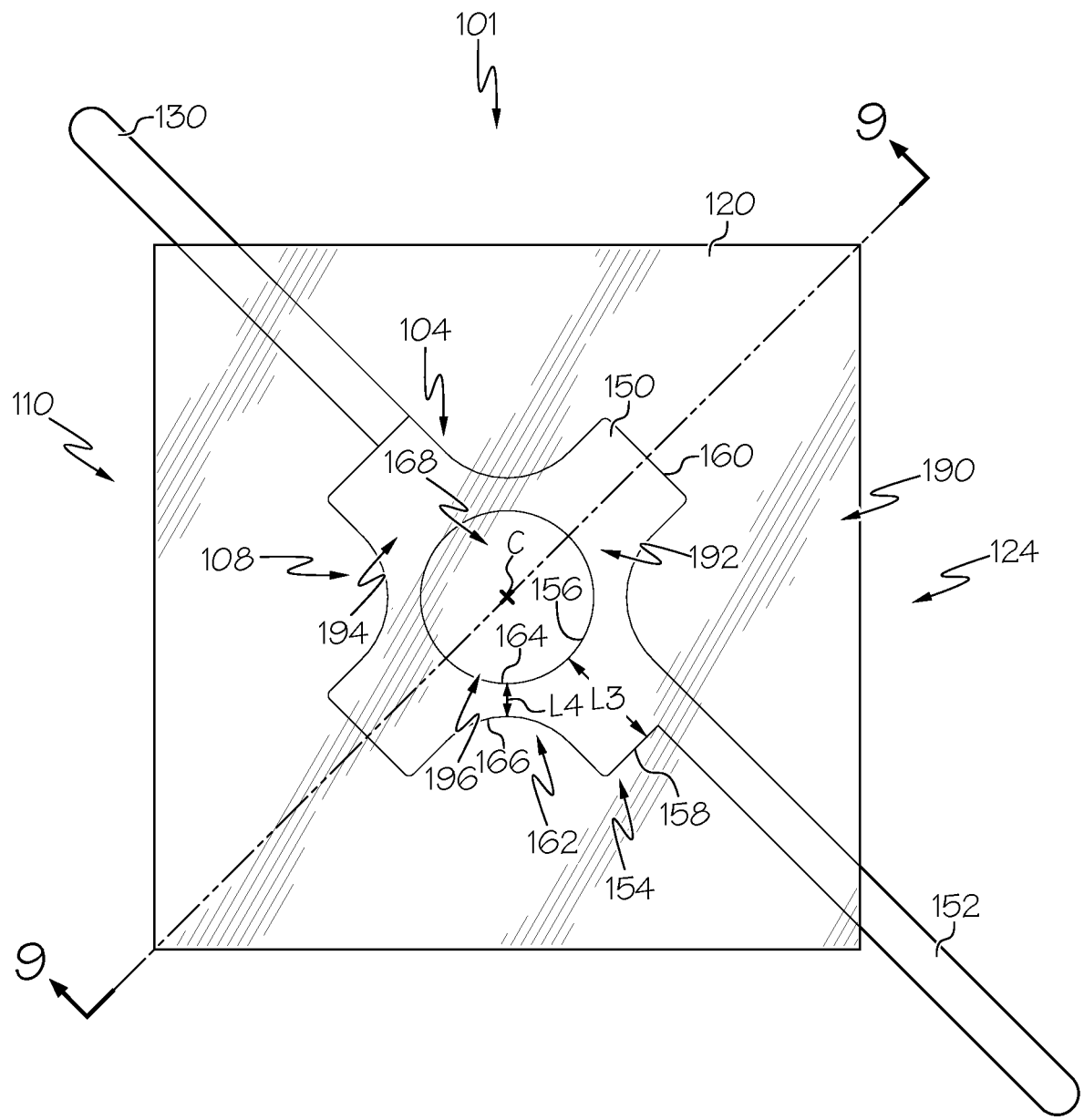
FIG. 8 schematically depicts a top view of the artificial muscle of FIG. 6, according to one or more embodiments shown and described herein.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 6-8, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 9:
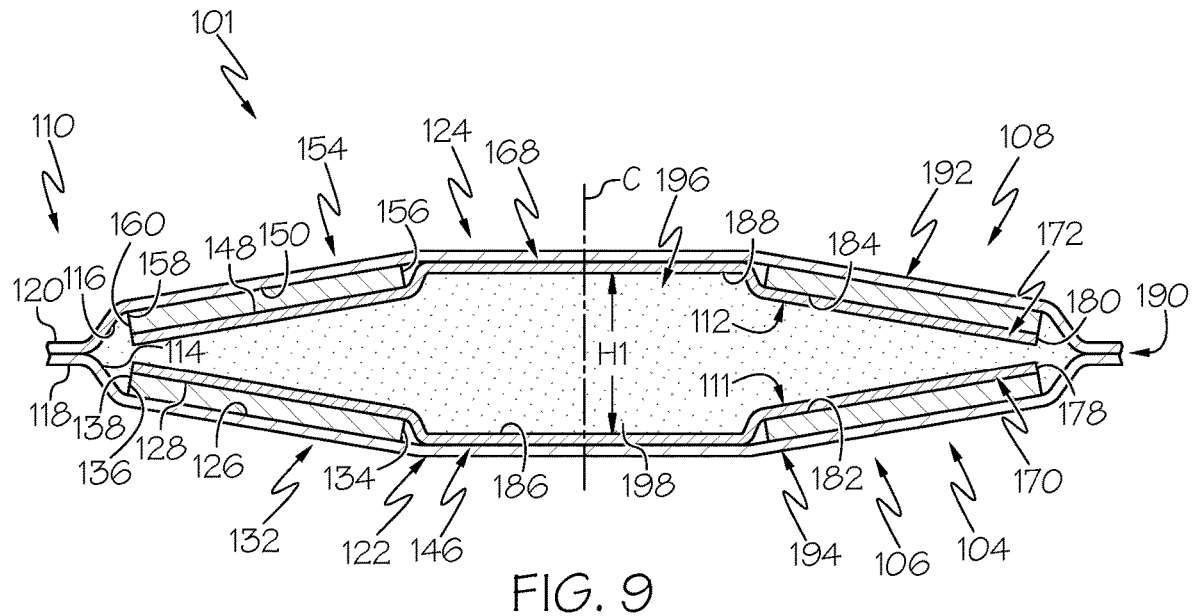
FIG. 9 schematically depicts a cross-sectional view of the artificial muscle of FIG. 7 taken along line 9-9 in FIG. 8 in a non-actuated state, according to one or more embodiments shown and described herein.
Figure 10:
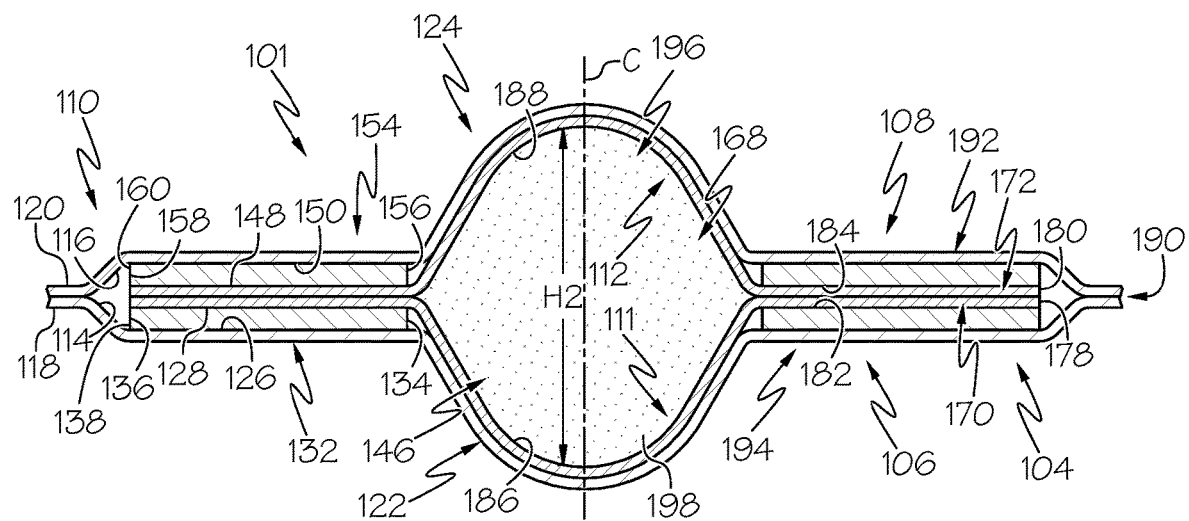
FIG. 10 schematically depicts a cross-sectional view of the artificial muscle of FIG. 7 taken along line 9-9 in FIG. 8 in an actuated state, according to one or more embodiments shown and described herein.
Figure 12:
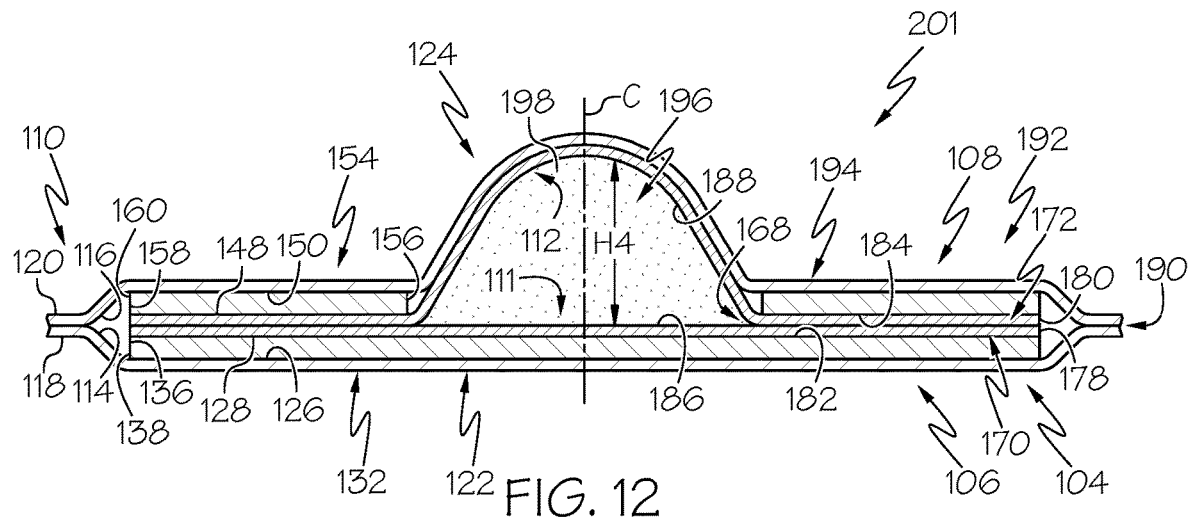
FIG. 12 schematically depicts a cross-sectional view of the artificial muscle of FIG. 10 in an actuated state, according to one or more embodiments shown and described herein.

Referring now to FIGS. 7-12, at least one of the first electrode 106 and the second electrode 108 have a central opening formed therein between the first end 134 of the tab portions 132 and the first end 142 of the bridge portions 140. In FIGS. 9 and 10, the first electrode 106 has a central opening 146. However, it should be understood that the first electrode 106 does not need to include the central opening 146 when a central opening is provided within the second electrode 108, as shown in FIGS. 11 and 12. Alternatively, the second electrode 108 does not need to include the central opening when the central opening 146 is provided within the first electrode 106. Referring still to FIGS. 7-12, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring now to FIGS. 8-12, the artificial muscle 101 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 6, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 101, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 101 using a needle or other suitable injection device.

Referring now to FIGS. 9 and 10, the artificial muscle 101 is actuatable between a non-actuated state and an actuated state. In the non-actuated state, as shown in FIG. 9, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In FIGS. 2 and 3, at least one of the one or more artificial muscles of the seat 10 is in the non-actuated state. In the actuated state, as shown in FIG. 10, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196. In FIG. 3, the artificial muscles 101A-F of the seat 10 are in the actuated state.

Referring now to FIG. 9, the artificial muscle 101 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 9, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 10, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 48 of FIG. 16). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments of the artificial muscle 101 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "Hydraulically amplified self-healing electrostatic actuators with muscle-like performance" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 101 including two pairs of tab portions 132, 154 on each of the first electrode 106 and the second electrode 108, respectively, reduces the overall mass and thickness of the artificial muscle 101, reduces the amount of voltage required during actuation, and decreases the total volume of the artificial muscle 101 without reducing the amount of resulting force after actuation as compared to known HASEL actuators including donut-shaped electrodes having a uniform, radially-extending width. More particularly, the tab portions 132, 154 of the artificial muscle 101 provide zipping fronts that result in increased actuation power by providing localized and uniform hydraulic actuation of the artificial muscle 101 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 101 is actuated, expansion of the expandable fluid region 196 produces a force of 3 Newton-millimeters (N·mm) per cubic centimeter (cm3) of actuator volume or greater, such as 4 N·mm per cm3 or greater, 5 N·mm per cm3 or greater, 6 N·mm per cm3 or greater, 7 N·mm per cm3 or greater, 8 N·mm per cm3 or greater, or the like. In one example, when the artificial muscle 101 is actuated by a voltage of 9.5 kilovolts (kV), the artificial muscle 101 provides a resulting force of 5 N. In another example, when the artificial muscle 101 is actuated by a voltage of 10 kV the artificial muscle 101 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 11 and 12, another embodiment of an artificial muscle 201 is illustrated. The artificial muscle 201 is substantially similar to the artificial muscle 101. As such, like structure is indicated with like reference numerals. However, as shown, the first electrode 106 does not include a central opening. Thus, only the second electrode 108 includes the central opening 168 formed therein. As shown in FIG. 11, the artificial muscle 201 is in the non-actuated state with the first electrode 106 being planar and the second electrode 108 being convex relative to the first electrode 106. In the non-actuated state, the expandable fluid region 196 has a first height H3. In the actuated state, as shown in FIG. 12, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 201. In addition, because the total deformation is formed on only one side of the artificial muscle 201, the second height H4 of the expandable fluid region 196 of the artificial muscle 201 extends further from a longitudinal axis perpendicular to the central axis C of the artificial muscle 201 than the second height H2 of the expandable fluid region 196 of the artificial muscle 101 when all other dimensions, orientations, and volume of dielectric fluid are the same. It should be understood that embodiments of the artificial muscle 201 may be used together with or in place of the one or more artificial muscles 101 of the seat 10 or seat assembly 91 of FIGS. 2-5.

Figure 13:
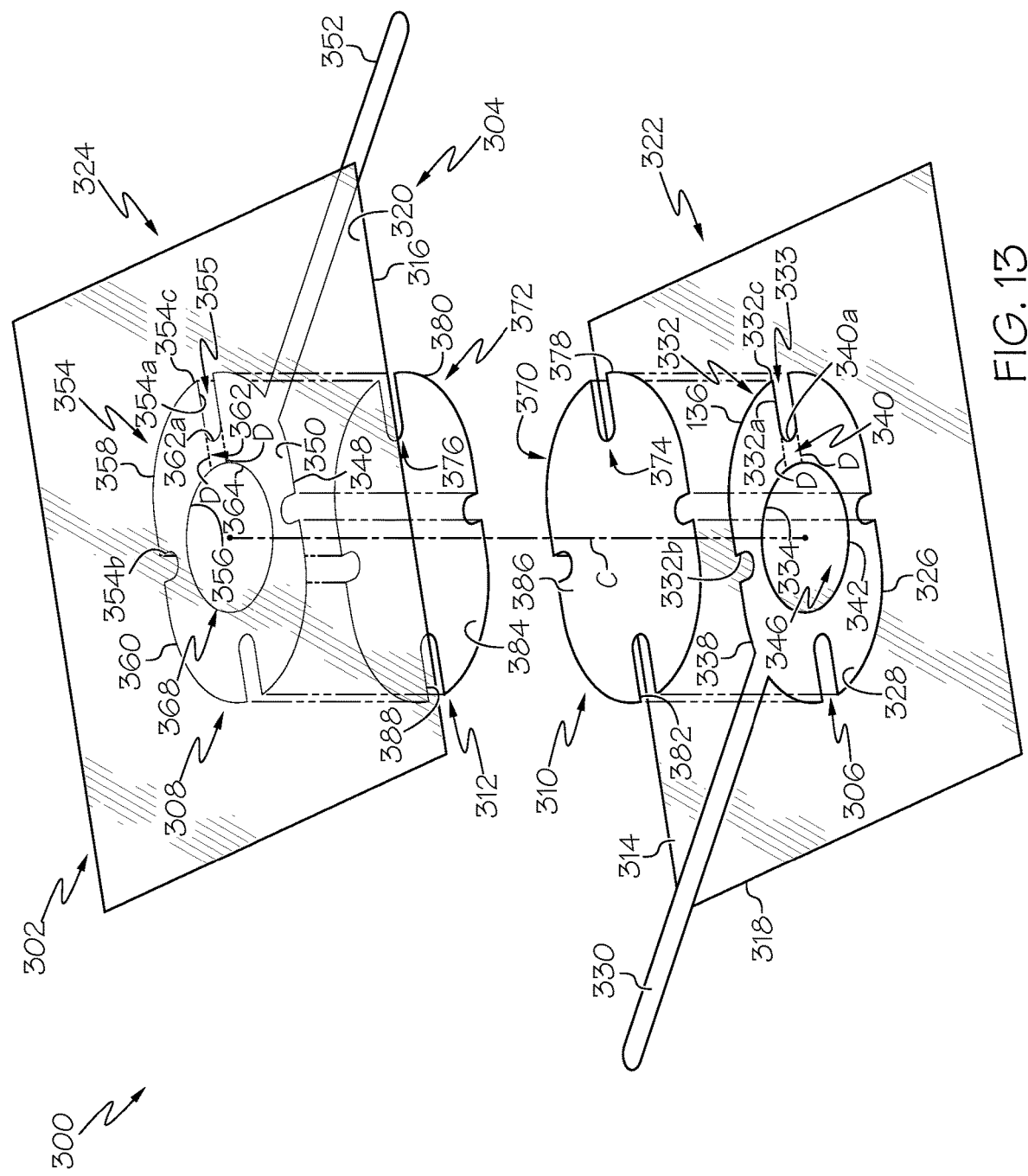
FIG. 13 schematically depicts an exploded view of another illustrative artificial muscle, according to one or more embodiments shown and described herein.
Figure 14:
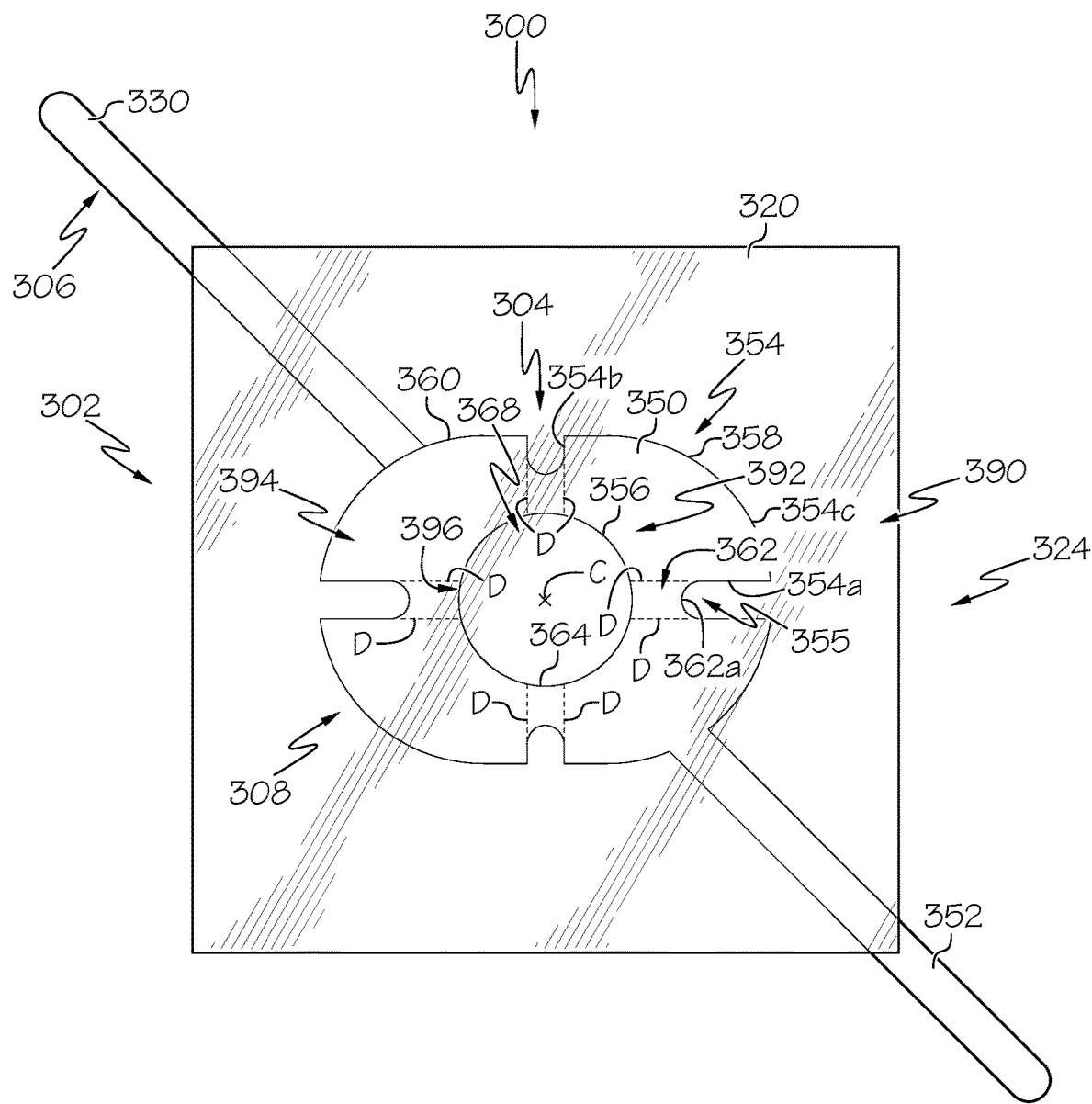
FIG. 14 schematically depicts a top view of the artificial muscle of FIG. 13, according to one or more embodiments shown and described herein.
Figure 15:
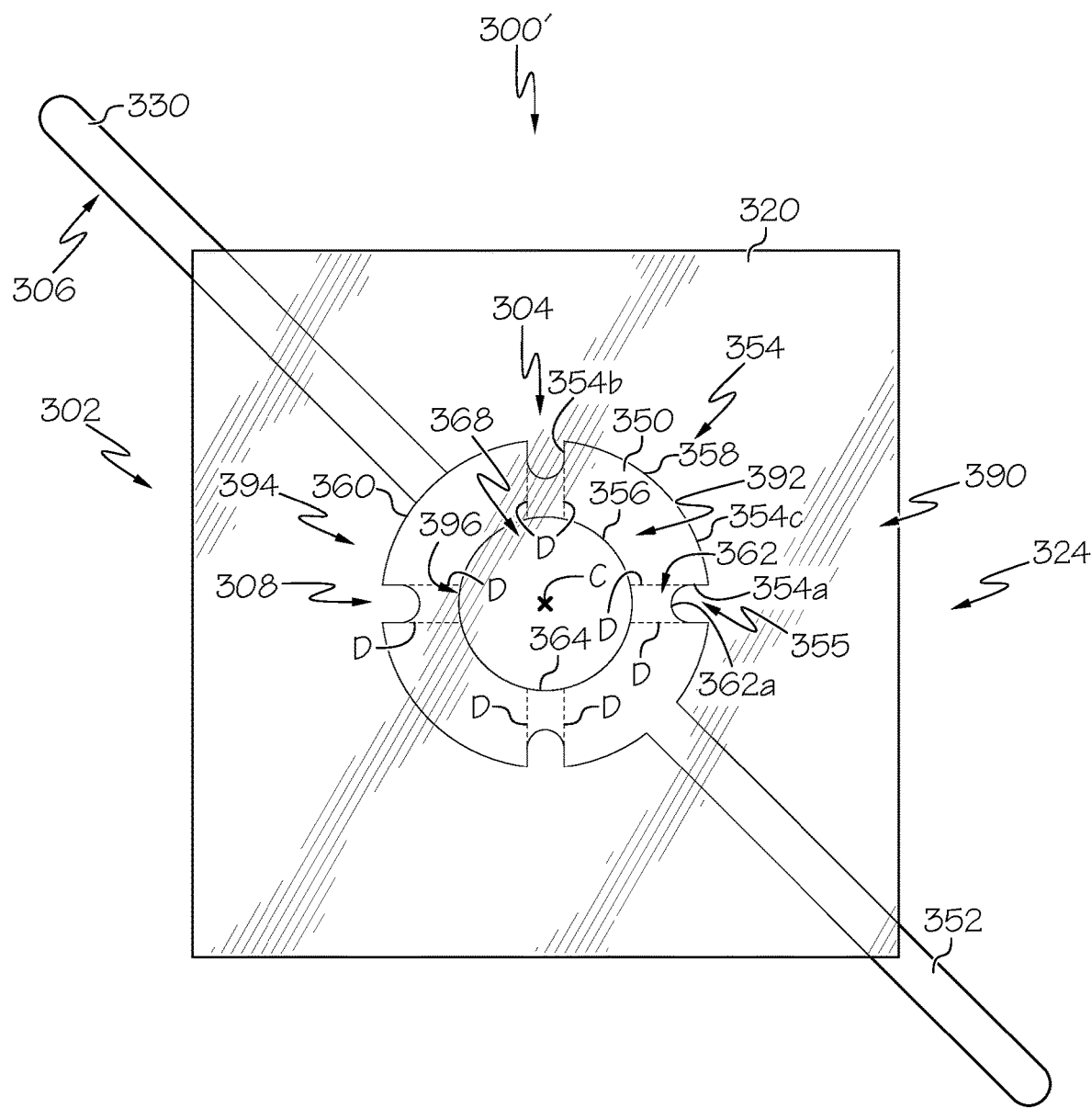
FIG. 15 schematically depicts a top view of another artificial muscle, according to one or more embodiments shown and described herein.

As shown in FIGS. 13-15, another embodiment of an artificial muscle 300 is illustrated. It should be appreciated that the artificial muscle 300 includes similar structure as the artificial muscle 101 (FIG. 7) and therefore operates similarly in operation to the artificial muscle 101 (FIG. 7). Accordingly, the artificial muscle 300 described herein may be incorporated in the seat 10 (FIG. 2) or liner 90 (FIG. 5) instead of, or in addition to, the previously described artificial muscles. Notably, the artificial muscle 300 includes fan portions 332 in place of the tab portions 132 (FIG. 7) discussed in relation to the artificial muscle 101 (FIG. 7). However, it should be understood that both the fan portions 332 of the artificial muscle 300 and the tab portions 132 are each generally a radially extending portion of an electrode of an artificial muscle, are positioned adjacent bridge portions, and provide a zipping functionality, as described above with respect to the artificial muscle 101 and 201, and below with respect to the artificial muscle 300. Indeed, these radially extending portions (e.g., tab portions and fan portions) each provide increased actuator power per unit volume, while minimizing buckling and rupture during operation.

Referring now to FIGS. 13 and 14, the artificial muscle 300 includes a housing 302, an electrode pair 304, including a first electrode 306 and a second electrode 308, fixed to opposite surfaces of the housing 302, a first electrical insulator layer 310 fixed to the first electrode 306, and a second electrical insulator layer 312 fixed to the second electrode 308. In some embodiments, the housing 302 is a one-piece monolithic layer including a pair of opposite inner surfaces, such as a first inner surface 314 and a second inner surface 316, and a pair of opposite outer surfaces, such as a first outer surface 318 and a second outer surface 320. In some embodiments, the first inner surface 314 and the second inner surface 316 of the housing 302 are heat-sealable. In other embodiments, the housing 302 may be a pair of individually fabricated film layers, such as a first film layer 322 and a second film layer 324. Thus, the first film layer 322 includes the first inner surface 314 and the first outer surface 318, and the second film layer 324 includes the second inner surface 316 and the second outer surface 320.

Throughout the ensuing description, reference may be made to the housing 302 including the first film layer 322 and the second film layer 324, as opposed to the one-piece housing. It should be understood that either arrangement is contemplated. In some embodiments, the first film layer 322 and the second film layer 324 generally include the same structure and composition. For example, in some embodiments, the first film layer 322 and the second film layer 324 each comprises biaxially oriented polypropylene.

The first electrode 306 and the second electrode 308 are each positioned between the first film layer 322 and the second film layer 324. In some embodiments, the first electrode 306 and the second electrode 308 are each aluminum-coated polyester such as, for example, Mylar®. In addition, one of the first electrode 306 and the second electrode 308 is a negatively charged electrode and the other of the first electrode 306 and the second electrode 308 is a positively charged electrode. For purposes discussed herein, either electrode 306, 308 may be positively charged so long as the other electrode 306, 308 of the artificial muscle 300 is negatively charged.

The first electrode 306 has a film-facing surface 326 and an opposite inner surface 328. The first electrode 306 is positioned against the first film layer 322, specifically, the first inner surface 314 of the first film layer 322. In addition, the first electrode 306 includes a first terminal 330 extending from the first electrode 306 past an edge of the first film layer 322 such that the first terminal 330 can be connected to a power supply to actuate the first electrode 306. Specifically, the terminal is coupled, either directly or in series, to a power supply and a controller of the actuation system 400 (FIG. 16). Similarly, the second electrode 308 has a film-facing surface 348 and an opposite inner surface 350. The second electrode 308 is positioned against the second film layer 324, specifically, the second inner surface 316 of the second film layer 324. The second electrode 308 includes a second terminal 352 extending from the second electrode 308 past an edge of the second film layer 324 such that the second terminal 352 can be connected to a power supply and a controller of the actuation system 400 (FIG. 16) to actuate the second electrode 308.

With respect now to the first electrode 306, the first electrode 306 includes two or more fan portions 332 extending radially from a center axis C of the artificial muscle 300. In some embodiments, the first electrode 306 includes only two fan portions 332 positioned on opposite sides or ends of the first electrode 306. In some embodiments, the first electrode 306 includes more than two fan portions 332, such as three, four, or five fan portions 332. In embodiments in which the first electrode 306 includes an even number of fan portions 332, the fan portions 332 may be arranged in two or more pairs of fan portions 332. As shown in FIG. 13, the first electrode 306 includes four fan portions 332. In this embodiment, the four fan portions 332 are arranged in two pairs of fan portions 332, where the two individual fan portions 332 of each pair are diametrically opposed to one another.

Each fan portion 332 has a first side edge 332a and an opposite second side edge 332b. As shown, the first terminal 330 extends from a second end 336 of one of the fan portions 332 and is integrally formed therewith. A channel 333 is at least partially defined by opposing side edges 332a, 332b of adjacent fan portions 332 and, thus, extends radially toward the center axis C. The channel 333 terminates at an end 340a of a bridge portion 340 interconnecting adjacent fan portions 332.

As shown in FIG. 13, dividing lines D are included to depict the boundary between the fan portions 332 and the bridge portions 340. The dividing lines D extend from the side edges 332a, 332b of the fan portions 332 to a first end 334 of the fan portions 332 collinear with the side edges 332a, 332b. It should be understood that dividing lines D are shown in FIG. 13 for clarity and that the fan portions 332 are integral with the bridge portions 340. The first end 334 of the fan portion 332, which extends between adjacent bridge portions 340, defines an inner length of the fan portion 332. Due to the geometry of the fan portion 332 tapering toward the center axis C between the first side edge 332a and the second side edge 332b, the second end 336 of the fan portion 332 defines an outer length of the fan portion 332 that is greater than the inner length of the fan portion 332.

Moreover, each fan portion 332 has a pair of corners 332c defined by an intersection of the second end 336 and each of the first side edge 332a and the second side edge 332b of the fan portion 332. In embodiments, the corners 332c are formed at an angle equal to or less than 90 degrees. In other embodiments, the corners 332c are formed at an acute angle.

As shown in FIG. 13, each fan portion 332 has a first side length defined by a distance between the first end 334 of the fan portion 332 and the second end 336 of the fan portion 332 along the first side edge 332a and the dividing line D that is collinear with the first side edge 332a. Each fan portion 332 also has a second side length defined by a distance between the first end 334 of the fan portion 332 and the second end 336 of the fan portion 332 along the second side edge 332b and the dividing line D that is collinear with the second side edge 332b. In embodiments, the first side length is greater than the second side length of the fan portion 332 such that the first electrode 306 has an ellipsoid geometry.

The second end 336, the first side edge 332a and the second side edge 332b of each fan portion 332, and the bridge portions 340 interconnecting the fan portions 332 define an outer perimeter 338 of the first electrode 306. In embodiments, a central opening 346 is formed within the first electrode 306 between the fan portions 332 and the bridge portions 340, and is coaxial with the center axis C. Each fan portion 332 has a fan length extending from a perimeter 342 of the central opening 346 to the second end 336 of the fan portion 332. Each bridge portion 340 has a bridge length extending from a perimeter 342 of the central opening 346 to the end 340a of the bridge portion 340, i.e., the channel 333. As shown, the bridge length of each of the bridge portions 340 is substantially equal to one another. Each channel 333 has a channel length defined by a distance between the end 340a of the bridge portion 340 and the second end of the fan portion 332. Due to the bridge length of each of the bridge portions 340 being substantially equal to one another and the first side length of the fan portions 332 being greater than the second side length of the fan portions 332, a first pair of opposite channels 333 has a channel length greater than a channel length of a second pair of opposite channels 333. As shown, a width of the channel 333 extending between opposing side edges 332a, 332b of adjacent fan portions 332 remains substantially constant due to opposing side edges 332a, 332b being substantially parallel to one another.

In embodiments, the central opening 346 has a radius of 2 centimeters (cm) to 5 cm. In embodiments, the central opening 346 has a radius of 3 cm to 4 cm. In embodiments, a total fan area of each of the fan portions 332 is equal to or greater than twice an area of the central opening 346. It should be appreciated that the ratio between the total fan area of the fan portions 332 and the area of the central opening 346 is directly related to a total amount of deflection of the first film layer 322 when the artificial muscle 300 is actuated. In embodiments, the bridge length is 20% to 50% of the fan length. In embodiments, the bridge length is 30% to 40% of the fan length. In embodiments in which the first electrode 306 does not include the central opening 346, the fan length and the bridge length may be measured from a perimeter of an imaginary circle coaxial with the center axis C.

Similar to the first electrode 306, the second electrode 308 includes two or more fan portions 354 extending radially from the center axis C of the artificial muscle 300. The second electrode 308 includes substantially the same structure as the first electrode 306 and, thus, includes the same number of fan portions 354. Specifically, the second electrode 308 is illustrated as including four fan portions 354. However, it should be appreciated that the second electrode 308 may include any suitable number of fan portions 354.

Each fan portion 354 of the second electrode 308 has a first side edge 354a and an opposite second side edge 354b. As shown, the second terminal 352 extends from a second end 358 of one of the fan portions 354 and is integrally formed therewith. A channel 355 is at least partially defined by opposing side edges 354a, 354b of adjacent fan portions 354 and, thus, extends radially toward the center axis C. The channel 355 terminates at an end 362a of a bridge portion 362 interconnecting adjacent fan portions 354.

As shown in FIG. 13, additional dividing lines D are included to depict the boundary between the fan portions 354 and the bridge portions 362. The dividing lines D extend from the side edges 354a, 354b of the fan portions 354 to the first end 356 of the fan portions 354 collinear with the side edges 354a, 354b. It should be understood that dividing lines D are shown in FIG. 13 for clarity and that the fan portions 354 are integral with the bridge portions 362. The first end 356 of the fan portion 354, which extends between adjacent bridge portions 362, defines an inner length of the fan portion 354. Due to the geometry of the fan portion 354 tapering toward the center axis C between the first side edge 354a and the second side edge 354b, the second end 358 of the fan portion 354 defines an outer length of the fan portion 354 that is greater than the inner length of the fan portion 354.

Moreover, each fan portion 354 has a pair of corners 354c defined by an intersection of the second end 358 and each of the first side edge 354a and the second side edge 354b of the fan portion 354. In embodiments, the corners 354c are formed at an angle equal to or less than 90 degrees. In other embodiments, the corners 354c are formed at an acute angle. During actuation of the artificial muscle 300, the corners 332c of the first electrode 306 and the corners 354c of the second electrode 308 are configured to be attracted to one another at a lower voltage as compared to the rest of the first electrode 306 and the second electrode 308. Thus, actuation of the artificial muscle 300 initially at the corners 332c, 354c results in the outer perimeter 338 of the first electrode 306 and the outer perimeter 360 of the second electrode 308 being attracted to one another at a lower voltage and reducing the likelihood of air pockets or voids forming between the first electrode 306 and the second electrode 308 after actuation of the artificial muscle 300.

As shown in FIGS. 13 and 14, in embodiments, the first side edge 354a of each fan portion 354 has a first side length defined by a distance between the first end 356 of the fan portion 354 and the second end 358 of the fan portion 354 along the first side edge 354a and the dividing line D that is collinear with the first side edge 354a. Each fan portion 354 also has a second side length defined by a distance between the first end 356 of the fan portion 354 and the second end 358 of the fan portion 354 along the second side edge 354b and the dividing line D that is collinear with the second side edge 354b. In embodiments, the first side length is greater than the second side length of the fan portion 354 such that the second electrode 308 has an ellipsoid geometry corresponding to the geometry of the first electrode 306.

The second end 358, the first side edge 354a and the second side edge 354b of each fan portion 354, and the bridge portions 362 interconnecting the fan portions 354 define an outer perimeter 360 of the second electrode 308. In embodiments, a central opening 368 is formed within the second electrode 308 between the fan portions 354 and the bridge portions 362, and is coaxial with the center axis C. Each fan portion 354 has a fan length extending from a perimeter 364 of the central opening 368 to the second end 358 of the fan portion 354. Each bridge portion 362 has a bridge length extending from the central opening 368 to the end 362a of the bridge portion 362, i.e., the channel 355. As shown, the bridge length of each of the bridge portions 362 is substantially equal to one another. Each channel 355 has a channel length defined by a distance between the end 362a of the bridge portion 362 and the second end of the fan portion 354. Due to the bridge length of each of the bridge portions 362 being substantially equal to one another and the first side length of the fan portions 354 being greater than the second side length of the fan portions 354, a first pair of opposite channels 355 has a channel length greater than a channel length of a second pair of opposite channels 355. As shown, a width of the channel 355 extending between opposing side edges 354a, 354b of adjacent fan portions 354 remains substantially constant due to opposing side edges 354a, 354b being substantially parallel to one another.

In embodiments, the central opening 368 has a radius of 2 cm to 5 cm. In embodiments, the central opening 368 has a radius of 3 cm to 4 cm. In embodiments, a total fan area of each of the fan portions 354 is equal to or greater than twice an area of the central opening 368. It should be appreciated that the ratio between the total fan area of the fan portions 354 and the area of the central opening 368 is directly related to a total amount of deflection of the second film layer 324 when the artificial muscle 300 is actuated. In embodiments, the bridge length is 20% to 50% of the fan length. In embodiments, the bridge length is 30% to 40% of the fan length. In embodiments in which the second electrode 308 does not include the central opening 368, the fan length and the bridge length may be measured from a perimeter of an imaginary circle coaxial with the center axis C.

As described herein, the first electrode 306 and the second electrode 308 each have a central opening 346, 368 coaxial with the center axis C. However, it should be understood that the first electrode 306 does not need to include the central opening 346 when the central opening 368 is provided within the second electrode 308. Alternatively, the second electrode 308 does not need to include the central opening 368 when the central opening 346 is provided within the first electrode 306.

Referring again to FIG. 13, the first electrical insulator layer 310 and the second electrical insulator layer 312 have a substantially ellipsoid geometry generally corresponding to the geometry of the first electrode 306 and the second electrode 308, respectively. Thus, the first electrical insulator layer 310 and the second electrical insulator layer 312 each have fan portions 370, 372 and bridge portions 374, 376 corresponding to like portions on the first electrode 306 and the second electrode 308. Further, the first electrical insulator layer 310 and the second electrical insulator layer 312 each have an outer perimeter 378, 380 corresponding to the outer perimeter 338 of the first electrode 306 and the outer perimeter 360 of the second electrode 308, respectively, when positioned thereon.

It should be appreciated that, in some embodiments, the first electrical insulator layer 310 and the second electrical insulator layer 312 generally include the same structure and composition. As such, in some embodiments, the first electrical insulator layer 310 and the second electrical insulator layer 312 each include an adhesive surface 382, 384 and an opposite non-sealable surface 386, 388, respectively. Thus, in some embodiments, the first electrical insulator layer 310 and the second electrical insulator layer 312 are each a polymer tape adhered to the inner surface 328 of the first electrode 306 and the inner surface 350 of the second electrode 308, respectively.

Referring now to FIG. 14, the artificial muscle 300 is shown in its assembled form with the first terminal 330 of the first electrode 306 and the second terminal 352 of the second electrode 308 extending past an outer perimeter of the housing 302, i.e., the first film layer 322 (FIG. 13) and the second film layer 324. The second electrode 308 is stacked on top of the first electrode 306 and, therefore, the first film layer 322 (FIG. 13) is not shown. In its assembled form, the first electrode 306, the second electrode 308, the first electrical insulator layer 310 (FIG. 13), and the second electrical insulator layer 312 (FIG. 13) are sandwiched between the first film layer 322 (FIG. 13) and the second film layer 324. The first film layer 322 (FIG. 13) is partially sealed to the second film layer 324 at an area surrounding the outer perimeter 338 (FIG. 13) of the first electrode 306 and the outer perimeter 360 of the second electrode 308. In some embodiments, the first film layer 322 (FIG. 13) is heat-sealed to the second film layer 324 (FIG. 13). Specifically, in some embodiments, the first film layer 322 (FIG. 13) is sealed to the second film layer 324 to define a sealed portion 390 surrounding the first electrode 306 and the second electrode 308. The first film layer 322 (FIG. 13) and the second film layer 324 may be sealed in any suitable manner, such as using an adhesive, heat sealing, vacuum sealing, or the like.

The first electrode 306, the second electrode 308, the first electrical insulator layer 310 (FIG. 13), and the second electrical insulator layer 312 (FIG. 13) provide a barrier that prevents the first film layer 322 (FIG. 13) from sealing to the second film layer 324, forming an unsealed portion 392. The unsealed portion 392 of the housing 302 includes an electrode region 394, in which the electrode pair 304 is provided, and an expandable fluid region 396, which is surrounded by the electrode region 394. The central openings 346 (FIG. 13), 368 of the first electrode 306 and the second electrode 308 define the expandable fluid region 396 and are arranged to be axially stacked on one another. Although not shown, the housing 302 may be cut to conform to the geometry of the electrode pair 304 and reduce the size of the artificial muscle 300, namely, the size of the sealed portion 390. A dielectric fluid is provided within the unsealed portion 392 and flows freely between the first electrode 306 and the second electrode 308

Referring now to FIG. 15, an alternative embodiment of an artificial muscle 300' is illustrated. It should be appreciated that the artificial muscle 300' is similar to the artificial muscle 300 described herein. As such, like structure is indicated with like reference numerals. The first electrode 306 and the second electrode 308 of the artificial muscle 300' have a circular geometry as opposed to the ellipsoid geometry of the first electrode 306 and the second electrode 308 of the artificial muscle 300 described herein. As shown in FIG. 15, with respect to the second electrode 308, a first side edge length of the first side edge 354a is equal to a second side edge length of the second side edge 354b. Accordingly, the channels 355 formed between opposing side edges 354a, 354b of the fan portions 354 each have an equal length. Although the first electrode 306 is hidden from view in FIG. 15 by the second electrode 308, it should be appreciated that the first electrode 306 also has a circular geometry corresponding to the geometry of the second electrode 308.

Referring now to FIGS. 13 and 14, actuation of the artificial muscle 300 will be discussed. In the non-actuated state, the first electrode 306 and the second electrode 308 are partially spaced apart from one another proximate the central openings 346, 368 thereof and the first end 334, 356 of the fan portions 332, 354. The second end 336, 358 of the fan portions 332, 354 remain in position relative to one another due to the housing 302 being sealed at the outer perimeter 338 of the first electrode 306 and the outer perimeter 360 of the second electrode 308. In the actuated state, the first electrode 306 and the second electrode 308 are brought into contact with and oriented parallel to one another to force the dielectric fluid 398 into the expandable fluid region 396. This causes the dielectric fluid 398 to flow through the central openings 346, 368 of the first electrode 306 and the second electrode 308 and inflate the expandable fluid region 396.

In the non-actuated state, a distance between the first end 334 of the fan portion 332 of the first electrode 306 and the first end 356 of the fan portion 354 of the second electrode 308 is greater than a distance between the second end 336 of the fan portion 332 of the first electrode 306 and the second end 358 of the fan portion 354 of the second electrode 308. This results in the electrode pair 304 zippering toward the expandable fluid region 396 when actuated. When actuated, the first electrode 306 and the second electrode 308 zipper toward one another from the second ends 336, 358 of the fan portions 332, 354 thereof, thereby pushing the dielectric fluid 398 into the expandable fluid region 396. When in the actuated state, the first electrode 306 and the second electrode 308 are parallel to one another. In the actuated state, the dielectric fluid 398 flows into the expandable fluid region 396 to inflate the expandable fluid region 396. As such, the first film layer 322 and the second film layer 324 expand in opposite directions.

Referring now to FIG. 16, an actuation system 400 may be provided for operating the seat 10, in particular, for operating the plurality of artificial muscles 101 (or 300, as used) of the seat 10, for example, based on sensor measurements of the one or more pressure sensors 62, instructions provided by a user, or a combination thereof. While operation of the seat 10 is discussed with reference to FIG. 16, it should be appreciated that similar description applies to the application of the liner 90. The actuation system 400 may comprise a controller 50, an operating device 46, a power supply 48, a display device 42, network interface hardware 44, and a communication path 41 communicatively coupled these components, some or all of which may be disposed in the onboard control unit 40. Furthermore, the actuation system 400 may be communicatively coupled to the plurality of artificial muscles 101 and the one or more pressure sensors 62.

The controller 50 comprises a processor 52 and a non-transitory electronic memory 54 to which various components are communicatively coupled. In some embodiments, the processor 52 and the non-transitory electronic memory 54 and/or the other components are included within a single device. In other embodiments, the processor 52 and the non-transitory electronic memory 54 and/or the other components may be distributed among multiple devices that are communicatively coupled. The controller 50 includes non-transitory electronic memory 54 that stores a set of machine-readable instructions. The processor 52 executes the machine-readable instructions stored in the non-transitory electronic memory 54. The non-transitory electronic memory 54 may comprise RAM, ROM, flash memories, hard drives, or any device capable of storing machine-readable instructions such that the machine-readable instructions can be accessed by the processor 52. Accordingly, the actuation system 400 described herein may be implemented in any conventional computer programming language, as pre-programmed hardware elements, or as a combination of hardware and software components. The non-transitory electronic memory 54 may be implemented as one memory module or a plurality of memory modules.

In some embodiments, the non-transitory electronic memory 54 includes instructions for executing the functions of the actuation system 400. The instructions may include instructions for operating the seat 10, for example, and instructions for actuating the plurality of artificial muscles 101, individually and/or simultaneously and collectively in stacks.

The processor 52 may be any device capable of executing machine-readable instructions. For example, the processor 52 may be an integrated circuit, a microchip, a computer, or any other computing device. The non-transitory electronic memory 54 and the processor 52 are coupled to the communication path 41 that provides signal interconnectivity between various components and/or modules of the actuation system 400. Accordingly, the communication path 41 may communicatively couple any number of processors with one another, and allow the modules coupled to the communication path 41 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 16, the communication path 41 communicatively couples the processor 52 and the non-transitory electronic memory 54 of the controller 50 with a plurality of other components of the actuation system 400. For example, the actuation system 400 depicted in FIG. 16 includes the processor 52 and the non-transitory electronic memory 54 communicatively coupled with the operating device 46 and the power supply 48.

The operating device 46 allows for a user to control operation of the plurality of artificial muscles 101 of the seat 10. In some embodiments, the operating device 46 may be a switch, toggle, button, or any combination of controls to provide user operation. The operating device 46 is coupled to the communication path 41 such that the communication path 41 communicatively couples the operating device 46 to other modules of the actuation system 400. The operating device 46 may provide a user interface for receiving user instructions as to a specific operating configuration of the seat 10, such as an operating configuration to alter the pressure between the upper surface 20 and the body part 8 by actuating user-selected stacks or individual artificial muscles 101, to operate the seat 10 in a feedback loop such that the pressure between the upper surface 20 and the body part 8 is automatically adjusted based on the pressure sensor 62 readings to maintain a desired pressure, or to operate the seat 10 in a massage or rhythmic pattern of actuation. Additional operating configurations of the seat 10 may also be selected by the user through the user interface.

The power supply 48 (e.g., battery) provides power to the one or more artificial muscles of the seat 10. In some embodiments, the power supply 48 is a rechargeable direct current power source. It is to be understood that the power supply 48 may be a single power supply or battery for providing power to the one or more artificial muscles of the seat 10. A power adapter (not shown) may be provided and electrically coupled via a wiring harness or the like for providing power to the plurality of artificial muscles of the seat 10 via the power supply 48.

In some embodiments, the actuation system 400 also includes a display device 42. The display device 42 is coupled to the communication path 41 such that the communication path 41 communicatively couples the display device 42 to other modules of the actuation system 400. The display device 42 may be located on the seat 10 or bike 4, for example, as part of the onboard control unit 40, and may output a notification in response to an actuation state of the artificial muscles 101 of the seat 10 or indication of a change in the actuation state of the one or more artificial muscles 101 of the seat 10. The display device 42 may also display sensor measurements, such as pressure measurements performed by the one or more pressure sensors 62. Moreover, the display device 42 may be a touchscreen that, in addition to providing optical information, detects the presence and location of a tactile input upon a surface of or adjacent to the display device 42. Accordingly, the display device 42 may include the operating device 46 and receive mechanical input directly upon the optical output provided by the display device 42.

In some embodiments, the actuation system 400 includes network interface hardware 44 for communicatively coupling the actuation system 400 to a portable device 58 via a network 56. The portable device 58 may include, without limitation, a smartphone, a tablet, a personal media player, or any other electric device that includes wireless communication functionality. It is to be appreciated that, when provided, the portable device 58 may serve to provide user commands to the controller 50, instead of the operating device 46. As such, a user may be able to control or set a program for controlling the artificial muscles 101 of the seat 10 utilizing the controls of the operating device 46. Thus, the artificial muscles 101 of the seat 10 may be controlled remotely via the portable device 58 wirelessly communicating with the controller 50 via the network 56.

It should now be understood that embodiments described herein are directed to seats that include a plurality of artificial muscles disposed in a cavity of the seat between an upper surface and a lower surface of the seat. The artificial muscles are actuatable to selectively apply pressure to the upper surface to apply a selective and customizable pressure to body part of a user whose weight is at least partially supported by the seat. The seat further includes one or more pressure sensors operable to measure the localized pressures applied to the upper surface and body part of the user by the artificial muscles. The selective and customizable actuation of the plurality of artificial muscles may adjust the pressure distribution applied to a body part of a user, increasing user comfort.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A seat comprising:
   an upper surface;
   a lower surface;
   one or more pressure sensors communicatively coupled to a controller; and
   a plurality of artificial muscles disposed between the upper surface and the lower surface, wherein:
      each of the plurality of artificial muscles is communicatively coupled to the controller;
      each of the plurality of artificial muscles comprise:
         a housing comprising an electrode region and an expandable fluid region;
         a dielectric fluid housed within the housing; and
         an electrode pair positioned in the electrode region of the housing, wherein the electrode pair is actuatable between a non-actuated state and an actuated state such that actuation from the non-actuated state to the actuated state directs the dielectric fluid into the expandable fluid region, expanding the expandable fluid region; and each of the one or more pressure sensors is respectively coupled to the housing of an individual artificial muscle of the plurality of artificial muscles in vertical alignment with the expandable fluid region of the housing and within a central opening encircling the expandable fluid region.

2. The seat of claim 1, wherein:
the upper surface and the lower surface define a cavity therebetween; and
the plurality of artificial muscles are disposed within the cavity.

3. The seat of claim 1, wherein the electrode pair comprises a first electrode fixed to a first surface of the housing and a second electrode fixed to a second surface of the housing, wherein:
the first electrode and the second electrode each comprise two or more radially extending portions and two or more bridge portions;
each of the two or more bridge portions interconnects adjacent radially extending portions; and
at least one of the first electrode and the second electrode comprises the central opening positioned between the two or more radially extending portions and encircling the expandable fluid region.

4. The seat of claim 3, wherein the first electrode and the second electrode each includes two pairs of radially extending portions and two pairs of bridge portions, each bridge portion interconnecting adjacent a pair of adjacent radially extending portions, each radially extending portion diametrically opposing an opposite radially extending portion.

5. The seat of claim 3, wherein:
when the electrode pair is in the non-actuated state, the first electrode and the second electrode are non-parallel to one another; and
when the electrode pair is in the actuated state, the first electrode and the second electrode are parallel to one another, such that the first electrode and the second electrode are configured to zipper toward one another and toward the central opening when actuated from the non-actuated state to the actuated state.

6. The seat of claim 1, wherein the plurality of artificial muscles comprise at least one stack of artificial muscles such that the expandable fluid region of each artificial muscle in the at least one stack of artificial muscles is coaxially aligned.

7. The seat of claim 6, wherein an axis of alignment of the plurality of artificial muscles in the at least one stack of artificial muscles is normal to the upper surface of the seat.

8. The seat of claim 1, wherein the plurality of artificial muscles are arranged in a monolayer.

9. The seat of claim 1, wherein the controller is configured to:
determine an initial pressure value from the one or more pressure sensors, wherein the initial pressure value indicates a pressure applied from the plurality of artificial muscles to the upper surface; and
modify actuation of the plurality of artificial muscles to achieve a desired pressure value, wherein the desired pressure value indicates a pressure applied from the plurality of artificial muscles to the upper surface that is different than the initial pressure value.

10. The seat of claim 1, wherein the controller is configured to accept instructions input from a user and modify actuation of the plurality of artificial muscles based on the instructions.

11. The seat of claim 1, wherein the one or more pressure sensors are each respectively coupled to the housing of an individual artificial muscle of the plurality of artificial muscles.

12. A seat assembly comprising:
a bike seat, the bike seat comprising a bike seat upper surface; and
a bike seat liner removably coupled to the bike seat, the bike seat liner comprising:
a liner upper surface;
a liner lower surface;
a controller
one or more pressure sensors communicatively coupled to the controller; and
a plurality of artificial muscles disposed between the liner upper surface and the liner lower surface, wherein:
each of the plurality of artificial muscles is communicatively coupled to the controller;
each of the plurality of artificial muscles comprise:
a housing comprising an electrode region and an expandable fluid region;
a dielectric fluid housed within the housing; and
an electrode pair positioned in the electrode region of the housing, wherein the electrode pair is actuatable between a non-actuated state and an actuated state such that actuation from the non-actuated state to the actuated state directs the dielectric fluid into the expandable fluid region, expanding the expandable fluid region; and
the controller is configured to:
determine a first initial pressure value from the one or more pressure sensors at a first portion of the bike seat;
determine a second initial pressure value from the one or more pressure sensors at a second portion of the bike seat; and
modify actuation of the plurality of artificial muscles within at least one of the first portion of the bike seat and the second portion of the bike seat to achieve a pressure distribution across the first portion of the bike seat and the second portion of the bike seat based on the first initial pressure value and the second initial pressure value.

13. The seat assembly of claim 12, wherein:
the liner upper surface and the liner lower surface define a cavity therebetween; and
the plurality of artificial muscles are disposed within the cavity.

14. The seat assembly of claim 12, wherein the electrode pair comprises a first electrode fixed to a first surface of the housing and a second electrode fixed to a second surface of the housing, wherein:
the first electrode and the second electrode each comprise two or more radially extending portions and two or more bridge portions;
each of the two or more bridge portions interconnects adjacent radially extending portions; and
at least one of the first electrode and the second electrode comprises a central opening positioned between the two or more radially extending portions and encircling the expandable fluid region.

15. The seat assembly of claim 14, wherein the first electrode and the second electrode each includes two pairs of radially extending portions and two pairs of bridge portions, each bridge portion interconnecting adjacent a pair of adjacent radially extending portions, each radially extending portion diametrically opposing an opposite radially extending portion.

16. The seat assembly of claim 14, wherein:
when the electrode pair is in the non-actuated state, the first electrode and the second electrode are non-parallel to one another; and
when the electrode pair is in the actuated state, the first electrode and the second electrode are parallel to one another, such that the first electrode and the second electrode are configured to zipper toward one another and toward the central opening when actuated from the non-actuated state to the actuated state.

17. A method for actuating a seat, the method comprising:
providing a voltage using a power supply electrically coupled to an electrode pair of an artificial muscle, the artificial muscle disposed in a cavity between an upper surface and a lower surface of the seat, wherein:
the artificial muscle comprises a housing having an electrode region and an expandable fluid region;
the electrode pair is positioned in the electrode region of the housing;
the electrode pair comprises a first electrode and a second electrode; and
a dielectric fluid is housed within the housing;
determining a first initial pressure value at a first portion of the seat;
determining a second initial pressure value at a second portion of the seat; and
applying the voltage to the electrode pair of the artificial muscle, thereby actuating the electrode pair from a non-actuated state to an actuated state such that the dielectric fluid is directed into the expandable fluid region of the housing and expands the expandable fluid region, thereby modifying actuation of the plurality of artificial muscles within at least one of the first portion of the seat and the second portion of the seat to achieve a pressure distribution across the first portion of the seat and the second portion of the seat based on the first initial pressure value and the second initial pressure value.

18. The method of claim 17, wherein the artificial muscle is one of a plurality of artificial muscles disposed in the cavity of the seat.

19. The method of claim 18, further comprising:
measuring a pressure applied to the upper surface of the seat using one or more pressure sensors disposed in the cavity of the seat; and
applying voltage to the plurality of artificial muscles in a selective manner to apply selective pressure to the upper surface of the seat in response to pressure measurements at the upper surface of the seat.

* * * * *